US011011967B2

(12) United States Patent
Zhang

(10) Patent No.: US 11,011,967 B2
(45) Date of Patent: May 18, 2021

(54) MASSIVE ENERGY STORAGE SYSTEM WITH DISTRIBUTED ROTOR OR MOVER STRUCTURE AND TRANSITIONAL ROTOR PULSE CURRENT

(71) Applicant: Daming Zhang, Kensington (AU)

(72) Inventor: Daming Zhang, Kensington (AU)

( * ) Notice: Subject to any disclaimer, the term of this patent is extended or adjusted under 35 U.S.C. 154(b) by 232 days.

(21) Appl. No.: 16/379,861

(22) Filed: Apr. 10, 2019

(65) Prior Publication Data

US 2020/0304006 A1    Sep. 24, 2020

(30) Foreign Application Priority Data

Mar. 20, 2019   (AU) .................................. 2019201920

(51) Int. Cl.
*H02K 41/03* (2006.01)
*H02K 1/12* (2006.01)
*H02K 1/22* (2006.01)
*H02K 3/12* (2006.01)
*H02J 3/28* (2006.01)
*H02J 3/38* (2006.01)

(52) U.S. Cl.
CPC ............... *H02K 41/03* (2013.01); *H02J 3/28* (2013.01); *H02J 3/382* (2013.01); *H02K 1/12* (2013.01); *H02K 1/22* (2013.01); *H02K 3/12* (2013.01)

(58) Field of Classification Search
CPC ............. H02K 41/03; H02K 1/12; H02K 3/46
USPC ................. 310/12.01, 12.14, 12.22, 12.28
See application file for complete search history.

(56) References Cited

U.S. PATENT DOCUMENTS

| 8,593,012 B2 * | 11/2013 | Peitzke | B61C 3/00 307/9.1 |
| 2004/0065080 A1 * | 4/2004 | Fasca | B66D 1/00 60/325 |
| 2006/0090668 A1 * | 5/2006 | Powell | H02J 3/28 105/350 |
| 2016/0138572 A1 * | 5/2016 | Boone | F03G 3/00 290/1 A |

FOREIGN PATENT DOCUMENTS

WO    2018/094448 A1    5/2018

OTHER PUBLICATIONS

Zhang, "Review on Heavy Mass Energy Storage and a New Such a System Using Interleaved Magnetic Structure", AUPEC 2018, Auckland, New Zealand, pp. 1-8.

(Continued)

*Primary Examiner* — Jose A Gonzalez Quinones
(74) *Attorney, Agent, or Firm* — Morgan, Lewis & Bockius LLP

(57) ABSTRACT

This invention discloses a significantly improved linear machine system used for massive energy storage with vertical movement of heavy mass placed in containers. It adopts distributed rotor or mover structure to minimize the fringing effect and thereby enhancing effective lifting force. It further adopts the pulse transitional current to those non-transitional rows of rotor or mover conductors when the transitional rotor or mover coils cross the boundary between the magnetic and non-magnetic layers of the stator.

4 Claims, 21 Drawing Sheets

(56) References Cited

OTHER PUBLICATIONS

Zhang, "A Heavy Mass Energy Storage System Using an AC-DC Linear Machine with Multiple Rotors and Enhanced Lifting Forces", Journal of Multidisciplinary Engineering Science and Technology, vol. 6, Issue 1, Jan. 2019, pp. 9361-9371.

Zhang, "Issues on Series-Parallel Circuits and their Drives in the Linear Machine for Heavy Mass Energy Storage System", 2019 IOP Conf. Ser.: Mater. Sci. Eng. 486 012082.

Zhang, "Energy Buffer and Other Issues in Heavy mass Energy Storage with Vertical Movement by Linear Machine", Journal of Multidisciplinary Engineering Science and Technology, vol. 6, Issue 6, Jun. 2019, pp. 10216-10223.

\* cited by examiner

MASSIVE ENERGY STORAGE SYSTEM WITH DISTRIBUTED ROTOR OR MOVER STRUCTURE AND TRANSITIONAL ROTOR PULSE CURRENT

FIELD OF INVENTION

This invention relates to a significantly improved linear machine for massive energy storage system. It is based on gravitational potential energy in heavy mass stored in a container, which is moved vertically or nearly vertically between a low platform or a parking lot and a high platform or a parking lot. Such system is used in power system for massively storing energy, be it wind or solar energy etc.

BACKGROUND

Most of the renewable energies such as wind energy, solar energy, and tidal wave energy etc are intermittent. To cope with such intermittence, massive energy storage is indispensable. Currently there are many existing energy storage systems, such as battery storage, pumped-hydro storage, fly-wheel storage, super-conducting magnetic energy storage, super-capacitor energy storage etc. Each of them has pros and cons. The main disadvantages of these systems are either relatively high cost to life span ratio or low efficiency.

To overcome the limitation in the existing energy storage systems, this invention introduces a heavy mass based energy storage system with less losses by shifting the heavy mass vertically or nearly vertically from low platform to high platform. Earlier the inventor filed one patent with the title "A MASSIVE ENERGY STORAGE SYSTEM WITH VERTICAL OR NEARLY VERTICAL MOVEMENT OF HEAVY MASS". Its number is PCT/AU2017/050769. It described the fundamental working mechanism and basic structures. This invention further discloses more new structures and significantly improved working methods for practical application, which are expansion and extension from the inventor's three recently published papers: 1) Daming Zhang, "Review on Heavy Mass Energy Storage and a New Such a System Using Interleaved Magnetic Structure", AUPEC 2018, Auckland, New Zealand, pp. 1-8. 2) Daming Zhang, "A Heavy Mass Energy Storage System Using an AC-DC Linear Machine with Multiple Rotor or Movers and Enhanced Lifting Forces", Journal of Multidisciplinary Engineering Science and Technology, on-line link: http://www.jmest.org/vol-6-issue-1-january-2019/, pp. 9361-9371, January 2019. 3) Daming Zhang, "Issues on Series-Parallel Circuits and their Drives in the Linear Machine for Heavy Mass Energy Storage System", $4^{th}$ Asia Conference on Power Electrical Engineering (ACPEE) 2019, Mar. 28-31, Hangzhou, China, pp. 1-11.

Such massive energy storage system could be built along the side of a steep mound or mountain, on top of which and at the bottom of which the high and low platforms or parking lots are built respectively to accommodate containers with heavy mass.

SUMMARY

The present invention overcomes or ameliorates at least one or more of the disadvantages of the prior art, or to provide a useful alternative.

This invention is on a massive energy storage system using potential energy in heavy mass stored in a container which is moved vertically or nearly vertically from a low platform to a high platform by operating the system as a motor, when there is surplus energy in grid/microgrid due to renewable energy generation or other generation; vice versa, when there is a shortage of renewable energy generation or other generation, the container with the heavy mass is lowered down to the low platform from high platform by operating the system as a generator. The energy is exchanged between potential energy in the heavy mass and electric energy in the microgrid/power grid through power electronics converters. Due to relatively heavy rotor or mover system, when the rotor or mover moves downward after lifting the containers with heavy masses from the low to high platforms, re-generation is necessary to convert the potential energy in rotor or mover itself to electric energy fed back into the power grid.

This invention adopts interleaved stator structure, distributed rotor or mover structure and multiple rows of the rotor or mover conductors across one stator layer, either magnetic or non-magnetic layer. It further adopts pulse transitional current for those rotor or mover conductors in the non-transitional rows when two sides of each of rotor coils in transition crosses the boundary between stator magnetic and non-magnetic layers. Furthermore forced cool air is blown to the rotors or movers during start/stop or under emergency in order to allow rotor or mover conductors to carry higher currents.

BRIEF DESCRIPTION OF THE DRAWINGS

FIG. 5 shows one of the horizontal cut cross sectional view of part of the rotor or mover structure for the system as shown in FIG. 3a and FIG. 4a;

FIG. 6 shows the rotor or mover frame for the system in FIG. 3a and FIG. 4a;

FIG. 8 shows the interlinking between neighbouring rows of the rotor or mover conductors in FIG. 7a;

DEFINITIONS

Figure 1A:
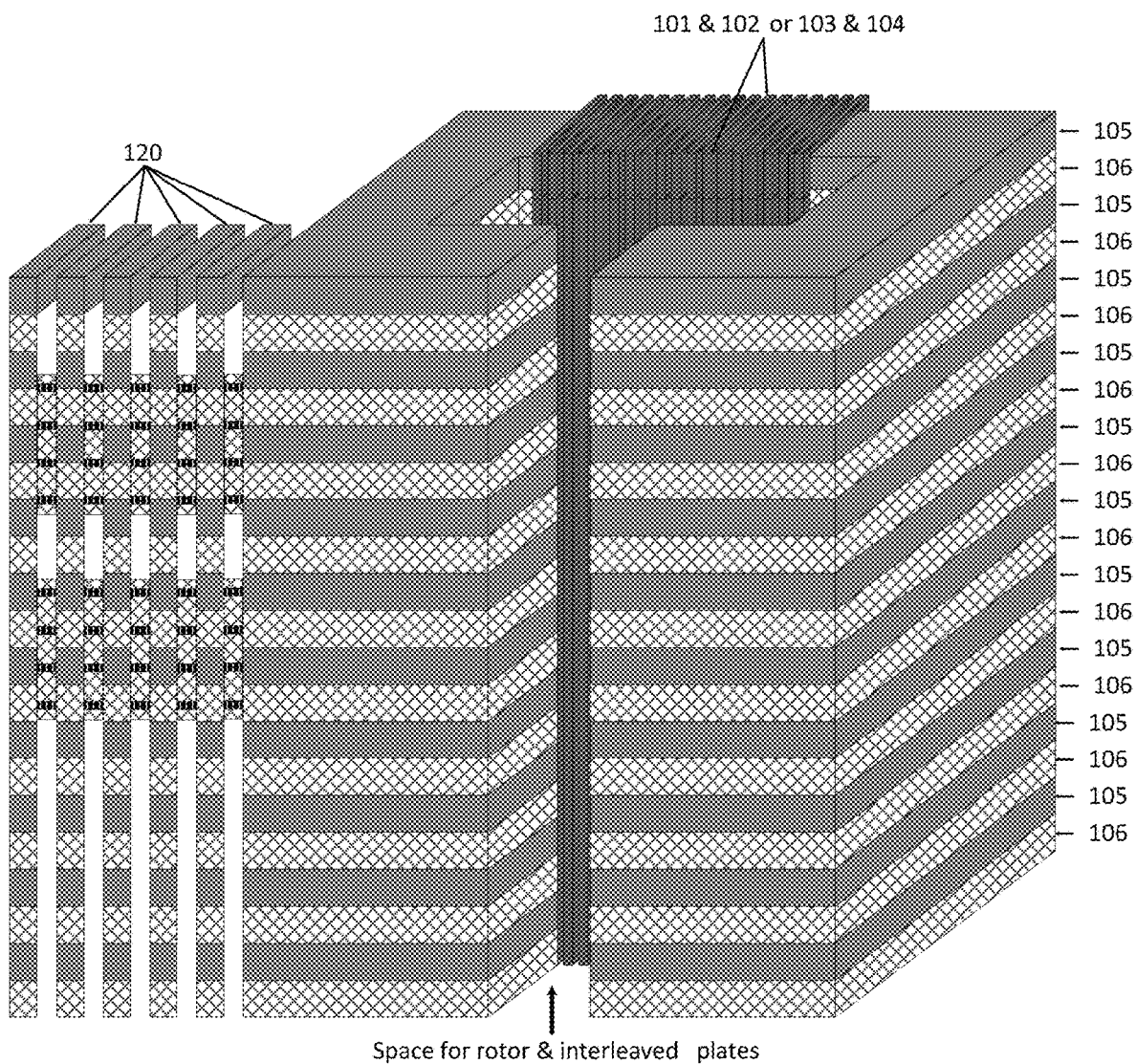
FIG. 1a shows 3-dimensional view of the linear machine system with distributed rotor or movers and interleaved stator plates.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

All of the publications cited in this specification are herein incorporated in their entirety by cross-reference.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

The term, "real-time", for example "displaying real-time data," refers to the display of the data without intentional delay, given the processing limitations of the system and the time required to accurately measure the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

Basic Rotor or Mover Conductor Unit

The basic rotor or mover conductor unit is formed by flat rotor or mover conductors sandwiched by the magnetic materials through insulators.

One Row of the Rotor or Mover Conductors

One row of the rotor or mover conductors is formed by multiple basic rotor or mover units which are placed shoulder by shoulder and placed in the stainless steel or other reinforcing side-open casings. Their terminals are out of the magnetic paths and also out of the casings and only enclosed by the insulators. The terminals of the conductors in one row of the rotor or mover conductors are joined with those in another corresponding row of the rotor or mover conductors in series to form one coil. The vertical distance for the two corresponding rows of the rotor or mover conductors is the same as that of the stator layer, either magnetic or non-magnetic. Across one interleaved stator layer, there could be two or more rows of the rotor or mover conductors.

One Pair of Rows or Two Corresponding Rows of the Rotor or Mover Conductors

One pair of rows or two corresponding rows of the rotor or mover conductors are the two rows of rotor conductors which have a centre-to-centre vertical distance same as that of one stator layer, either magnetic or non-magnetic. Part or all of conductors in the two rows are connected in series to form rotor or mover coil or coils as defined below.

One Rotor or Mover Coil

One rotor or mover coil is formed by connecting in series the terminals of some or all the basic rotor or mover conductor units in one pair of rows or two corresponding rows of the rotor or mover conductors in the horizontal coil arrangement. The vertical separation distance between one pair of rows or two corresponding rows of the rotor or mover conductors is the same as that of one layer of the stator, either magnetic or non-magnetic layer. That is to say, one pair of rows or two corresponding rows of the rotor or mover conductors can form one coil or can be divided into several groups, each of which forms one coil.

For the vertical coil arrangement, one basic rotor or mover coil is defined as rotor or mover coil spanning the whole rotor vertical length and across all the corresponding stators layers in the form of single coil.

One Basic Rotor or Mover Coil Unit

One basic rotor or mover coil unit is defined as rotor or mover coils across two neighbouring stator layers for horizontal coil arrangement.

In one rotor or mover set, there are multiple identical basic rotor coil units across multiple pairs of the stator layer, each pair being formed by one magnetic layer and one non-magnetic layer. For the vertical coil arrangement, one basic rotor or mover coil unit could be just one rotor or mover coil. It could be also formed by connecting in series several rotor or mover coils.

Stainless Steel Casing

The stainless steel casing is formed by the top and bottom stainless steel plates interlinked by supports stubs at four corners and centres. Its empty parts between the top and bottom plates are to accommodate one row of the rotor or mover conductors.

The stainless steel casings with one row of the rotor or mover conductors are placed layer by layer vertically. They are joined by stainless steel support or other reinforcement. Across one stator layer, there could be multiple rotor or mover conductor rows.

Distributed Rotor or Mover Unit

The distributed rotor or mover unit is formed by multiple pairs of stainless steel casings spreading vertically in one distributed air-gap, each pair accommodating one pair of rows or two corresponding rows of the rotor or mover conductors, with any two neighbouring casings interlinked by the stainless steel support. Across two neighbouring stator layers, there are two pairs or more pairs of the stainless casings. In the invented linear machine system, there are several distributed rotor or mover units, each of which is sandwiched between two neighbouring interleaved stator plates with a small separation space.

When necessary, coils from different distributed rotor or mover units sandwiched by the interleaved stator plates can be connected in series.

One Rotor or Mover Set

One rotor or mover set is formed by multiple distributed rotor or mover units in one big air-gap formed by several distributed air-gaps and stator interleaved plates. Each distributed air-gap accommodates one distributed rotor or mover unit, and each distributed rotor or mover unit is sandwiched by two neighbouring interleaved stator plates. Coils in different distributed rotor or mover units could be connected in series or in parallel.

One Layer of Rotor or Mover Sets

One layer of rotor or mover sets in one linear machine system is formed by all those rotor or mover sets, spanned at the same vertical positions and accommodated in each of stator air gaps. In one linear machine, there could be more than one layer of rotor or mover sets, spanning at different vertical positions. This is for moving more containers with heavy mass at one time and shortening time for moving all containers between low and high platforms.

DETAILED DESCRIPTION

Potential energy storage using heavy mass could potentially be a good substitute of pumped hydro based energy storage. This is because some heavy mass such as concrete or other heavy masses has a mass density several times as high as that of water. Hence such energy storage system occupies less space. Furthermore the heavy masses can be repetitively used for many years. U.S. Pat. No. 8,593,012 B2 proposed to use trains to drive the heavy mass from low platform to high platform to store energy. In such energy storage system, energy losses due to friction are quite high, making overall system efficiency low. The inventor earlier filed a patent on heavy mass energy storage with the title "A MASSIVE ENERGY STORAGE SYSTEM WITH VERTICAL OR NEARLY VERTICAL MOVEMENT OF HEAVY MASS". Its number is PCT/AU2017/050769. After that, he further published three papers: 1) Daming Zhang, "Review on Heavy Mass Energy Storage and a New Such a System Using Interleaved Magnetic Structure", AUPEC 2018, Auckland, New Zealand, pp. 1-8. 2) Daming Zhang, "A Heavy Mass Energy Storage System Using an AC-DC Linear Machine with Multiple Rotor or Movers and Enhanced Lifting Forces", Journal of Multidisciplinary Engineering Science and Technology, on-line link: http://www.jmest.org/vol-6-issue-1-january-2019/, pp. 9361-9371, January 2019. 3) Daming Zhang, "Issues on Series-Parallel Circuits and their Drives in the Linear Machine for Heavy Mass Energy Storage System", 4$^{th}$ Asia Conference on Power Electrical Engineering (ACPEE) 2019, Mar. 28-31, Hangzhou, China, pp. 1-11.

To make heavy mass based energy storage a feasible solution, efficiency issue needs be solved first. In this invention, a new method is proposed to minimize friction when moving the heavy masses from low platform to high platform or vice versa. The key forming components in the system and how each one works are described below.

Figure 1B:
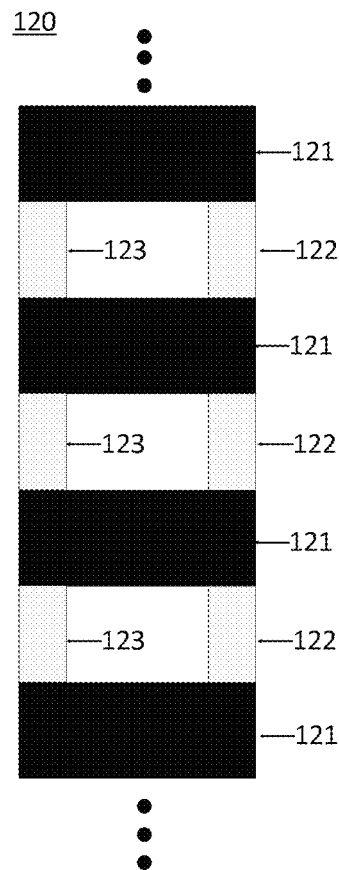
FIG. 1b shows side view of interleaved stator plates, spreading from the top to bottom of the passage.
Figure 1C:
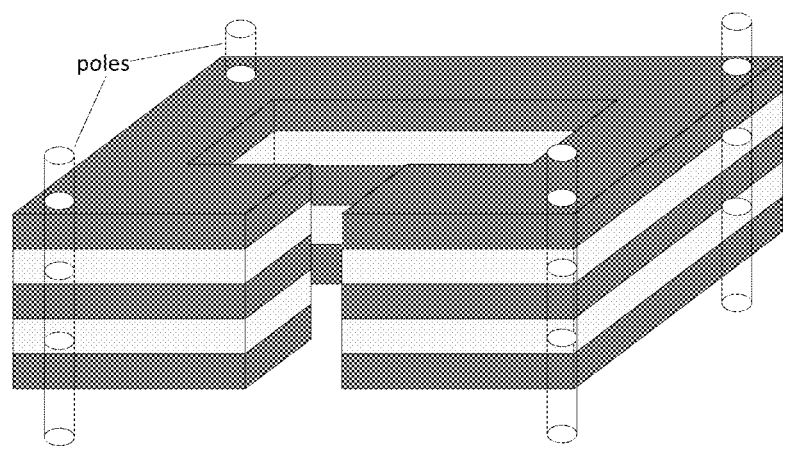
FIG. 1c shows the pole-supported stator interleaved structure with non-magnetic layer left as air.
Figure 1D:
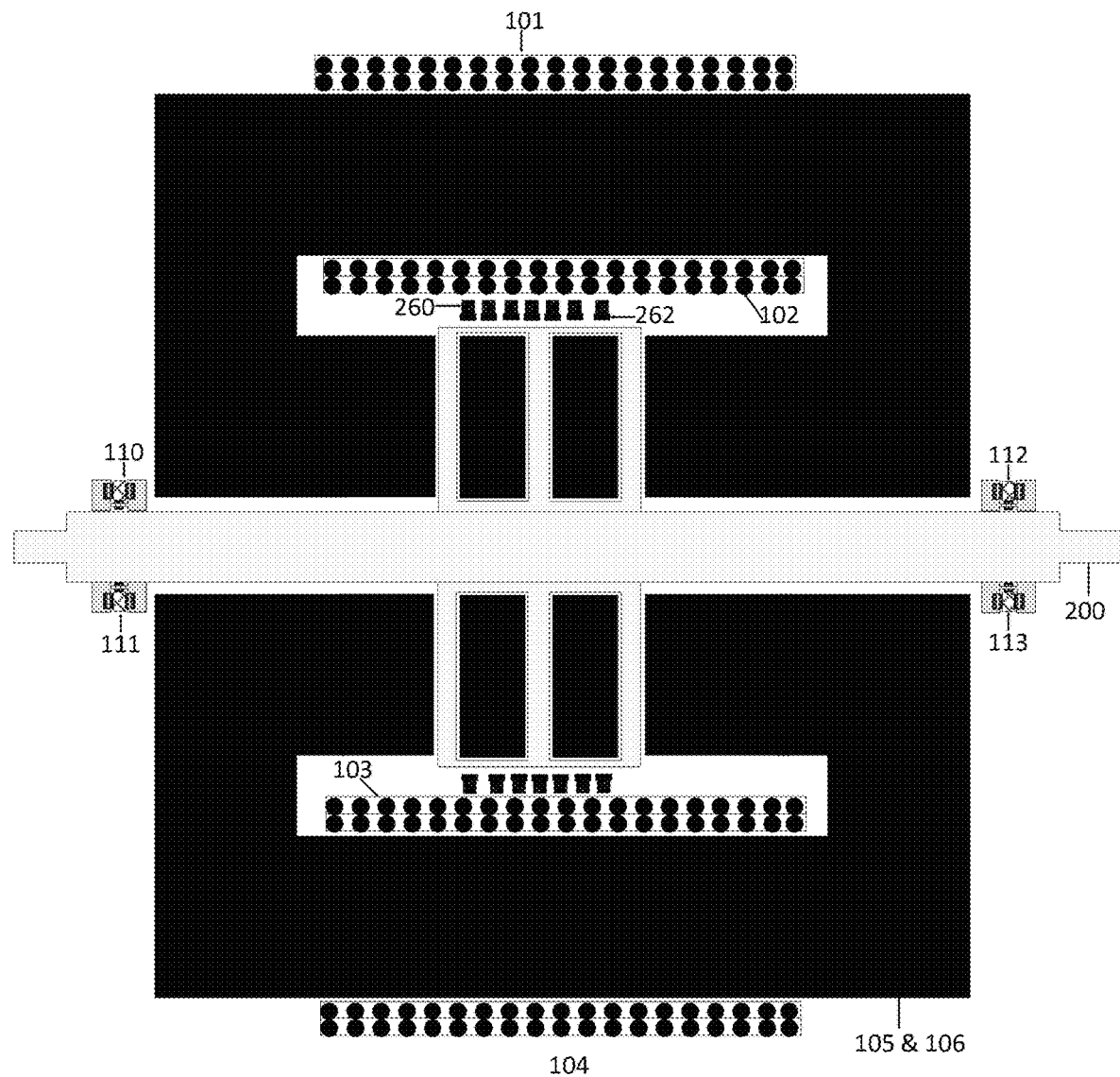
FIG. 1d shows the horizontal cut-cross view of the system where stator structure is symmetrical with two nearly closed magnetic paths.

FIG. 1a shows one possible configuration of the linear machine system, where the stator is formed by the interleaved magnetic layer 105, which could be sealed in some rain-proof materials, such as plastics to have long life span, and non-magnetic layer 106 and also interleaved stator plates 120. Necessary pavilion needs be built to shield the system in FIG. 1a against ingress of rain or snow or other harsh weather conditions. FIG. 1b shows the side view of the interleaved stator plate 120 in which there are stainless steel support 122 and 123 between magnetic layers 121. When necessary, the supports at two sides can be installed spreading from the top to the bottom of the passage. FIG. 1c shows the pole-support stator magnetic layer with non-magnetic layer left as air. Such structure can accommodate distributed stator windings wound around each magnetic layer and interconnected in series. This is in contrast with the lumped stator windings as shown in FIG. 1a. FIG. 1d shows the horizontal cut-cross sectional view of a symmetrical linear machine structure, in which there are two nearly closed-loop magnetic paths. The structure in FIG. 1d is a horizontal cut cross section of the mirror arrangement of the structure as shown in FIG. 1a. There are also reinforcing mechanic parts on the two rotor or movers. Due to symmetry in FIG. 1d, it is relatively easier to minimize the friction losses when the heavy masses are lifted vertically along the support poles 110, 111, 112 and 113. FIG. 1d also shows the carbon brushes 262 which contact the vertical conductors 260 spreading from the bottom to the top of the passage. Between brushes and terminals of the rotor or mover coils there are converter circuits described in a later paragraph. In another arrangement where the power converters sit on either low or high platform and connected with multiple pairs of the vertical conductors spreading from low to high platforms, carbon brushes will be connected with the rotor or mover circuits directly.

Figure 2A:
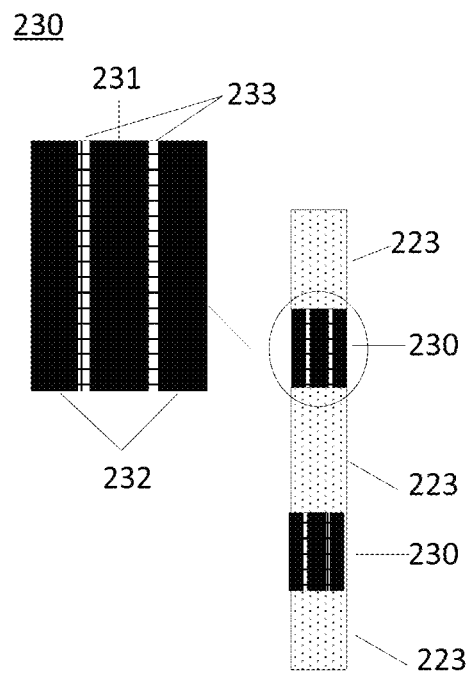
FIG. 2a shows the basic unit of the flat rotor or mover conductors sandwiched in the magnetic materials through insulators.

To reduce the air gap and thereby decrease ampere-turns requirement on the stator winding 101-102 and 103-104 as seen in FIG. 1d, flat conductors 231 is adopted and shown in FIG. 2a, in which the rotor or mover conductors 231 are sandwiched by the magnetic materials 232 through insulators 233. This is to enhance mechanic strength.

Figure 2B:
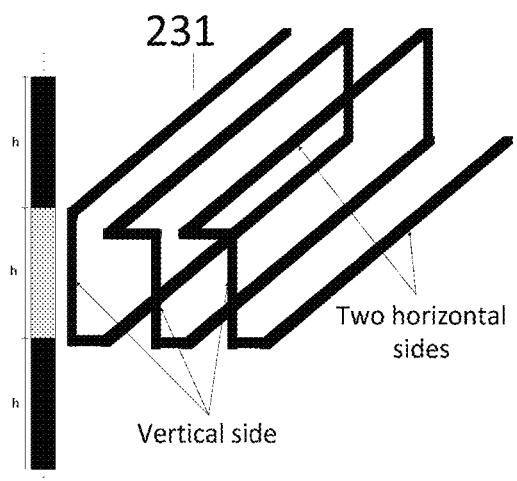
FIG. 2b shows one rotor or mover coil with several conductors connected in series.

FIG. 2b shows one configuration for series-connected rotor or mover conductors 231 from multiple basic rotor or mover conductor units, with horizontal conductors being insulated and embedded in magnetic materials through insulators as shown in FIG. 2a and with vertical connecting conductors being insulated only. That is to say, the terminal conductor out of the magnetic path is only enclosed by insulators. The centre-to-centre distance h between up-down sides of the coil is the same as that of the stator layer, either magnetic or non-magnetic. This coil is called horizontal coil arrangement. Another possible winding is shown in 1) Daming Zhang, "Review on Heavy Mass Energy Storage and a New Such a System Using Interleaved Magnetic Structure", AUPEC 2018, Auckland, New Zealand, pp. 1-8. 2) Daming Zhang, "A Heavy Mass Energy Storage System Using an AC-DC Linear Machine with Multiple Rotor or movers and Enhanced Lifting Forces", Journal of Multidisciplinary Engineering Science and Technology, on-line link: http://www.jmest.org/vol-6-issue-1-january-2019/, pp. 9361-9371, January 2019. One may shorten the horizontal distance of the conductor for placing the rotor or mover conductors within one distributed rotor or mover unit. This is shown in FIG. 2e, which is called vertical coil arrangement. In FIG. 2e, coils 11', 22' and 33' could be connected in series. For such kind of vertical arrangement, across each stator layer, there could be multiple rows of the rotor or mover conductors formed from different rotor or mover coil units. For such kind of arrangement, across one stator layer, there could be more than one row of the rotor or mover conductors, though only one row of the rotor or mover conductors is shown in FIG. 2e.

Figure 2C:
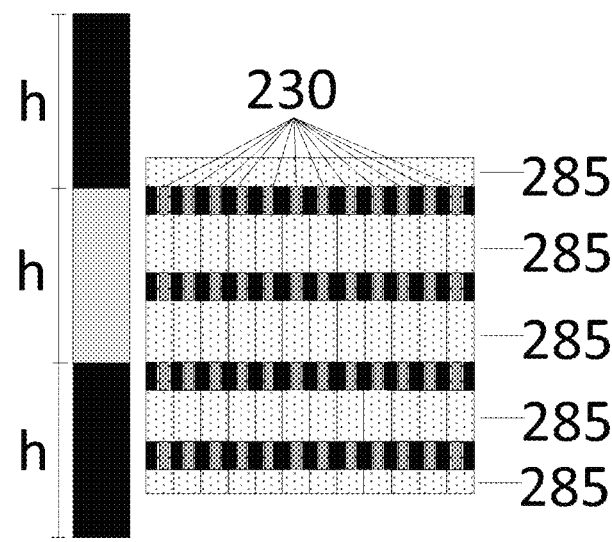
FIG. 2c shows one possible rotor or mover configurations with two rows of the rotor or mover conductors across one stator layer.
Figure 2D:
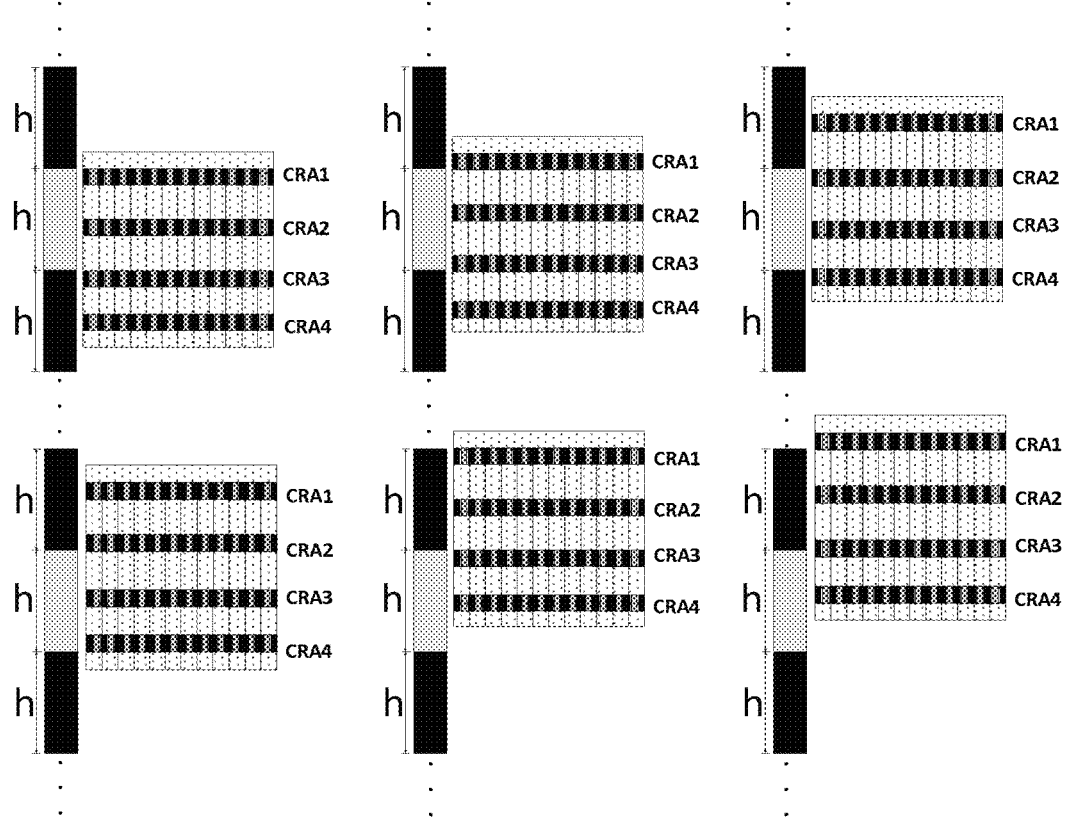
FIG. 2d shows the upward movement of the rotor or mover structures with two rows of the rotor or mover conductors across one stator layer.
Figure 2E:
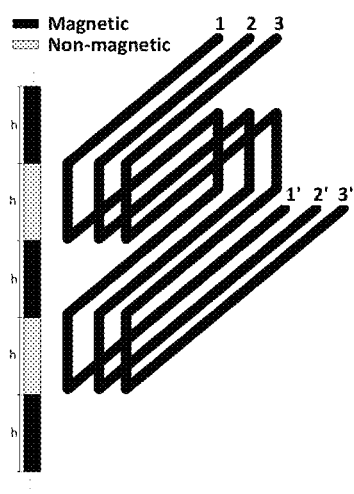
FIG. 2e shows another way to form rotor coils.

FIGS. 2c and 2d show vertical cut cross section of rotor or mover structure with combined sets where there are two rows of the rotor or mover conductors across each layer of the stator. It contains multiple basic rotor or mover conductor units 230 and stainless steel based supports 285. Rows CRA1 and CRA3 wound in the way as shown in FIG. 2b form two sides of one coil. CRA2 and CRA4 wound also in the way as shown in FIG. 2b form two sides of another coil. Each of the coils is supplied with AC current to ensure the electromagnetic force always uplifting. CRA1-CRA3 is grouped into set 1; CRA2-CRA4 is grouped into set 2. Instead of forming just one coil, either of CRA1-CRA3 or CRA2-CRA4 can be separated into multiple coils by having less turns in one coil. There could be three rows or even more rows of the rotor or mover conductors across one stator layer. By doing so, the system becomes more compact. For such system with multiple rows of the rotor or mover conductors across one stator layer, connections of terminals of the rotor or mover conductors sandwiched in magnetic material need more attention.

For a practical system, to have enough electromagnetic lifting force, there needs be multiple groups of coils like CRA1-CRA3 and CRA2-CRA4, each group spreading across two stator layers. The corresponding coils from different groups could be connected in series when necessary. The currents in the corresponding coils spreading across each of two stator layers are the same, either the same as the top one in FIG. 9 if it is the coil corresponding to CRA1-CRA3 or the same as the bottom one in FIG. 9 if it is the coil corresponding to CRA2-CRA4.

Figure 3A:
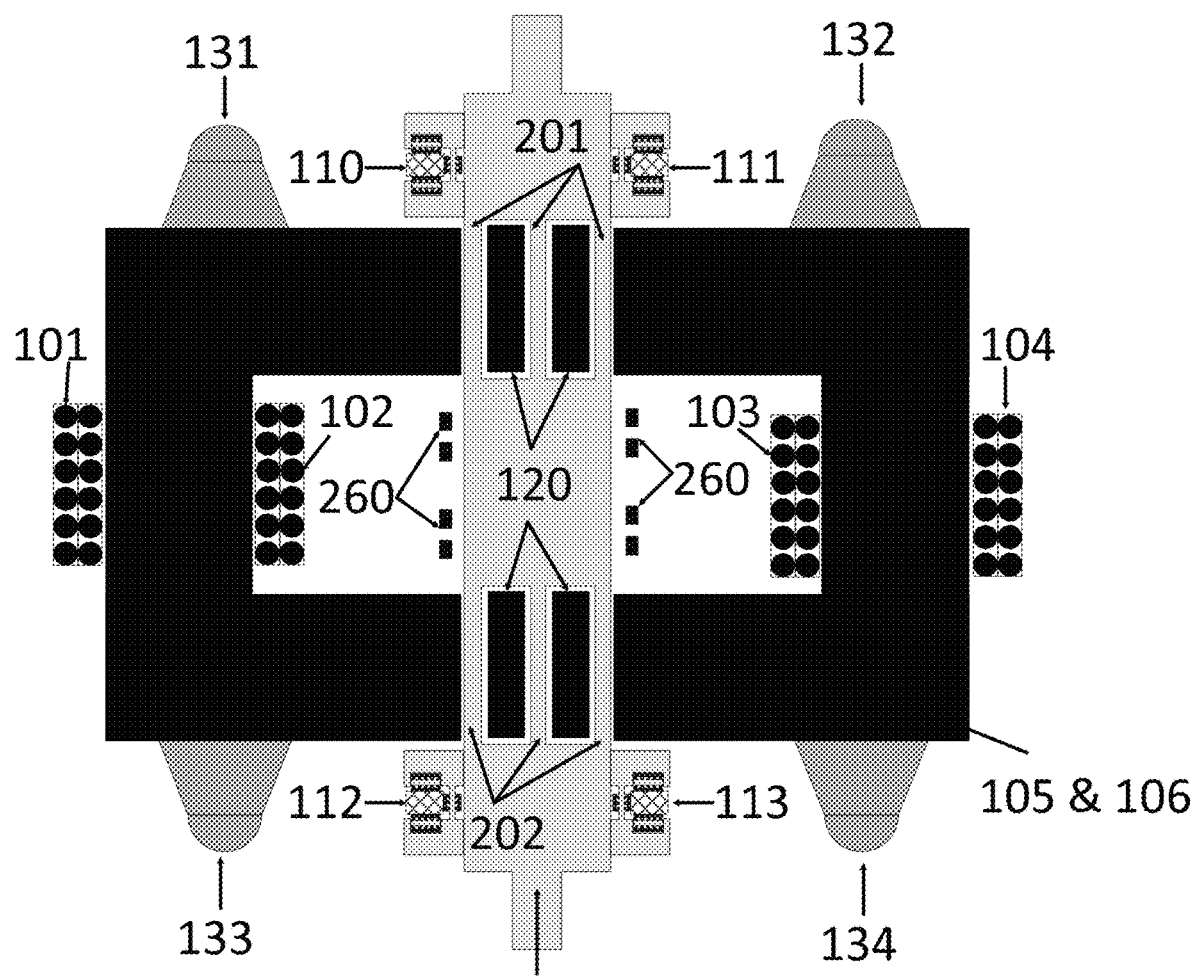
FIG. 3a shows the horizontal cut-cross sectional view of one new configuration of the machine system in which stator structures are in double-U shape with rectangular corners.

Alternatively, the horizontal cut cross sectional view of another structure of the linear machine system is shown in FIG. 3a, where double-U shape stator structure with rectangular corners is taken. There are two identical rotor or mover units 201 and 202, each of which is distributed one and sandwiched in interleaved stator plates 120 with air space separation as that in FIG. 1d. There are also two sets of the stator windings 101-102 and 103-104 wound on the interleaved stator structure 105 and 106 as that in FIG. 1d, either lumped or distributed. The flux produced by the two sets of the stator windings 101-102 and 103-104 enhances each other. Conductors 260 spreading from the bottom to the top of the passage are necessary to provide currents into the rotor or mover circuit through carbon brush contacts and converters. The style of the rotor or mover windings are the same as those shown in FIG. 2d or others with more rows of the rotor or mover conductors across one stator layer. The non-magnetic alternating stator layer is air. Then each of the stator magnetic layers could sit on the chassis joined with two pairs of support poles 131-133, and 132-134, spreading from the bottom to top of the passage. One of the bearing structures in FIG. 3a is magnified and shown in FIG. 3b, where there are three sets of the bearings 240A, 240B, and 240C touching the pole 110 spreading from the bottom to the top of the passage.

Figure 4A:
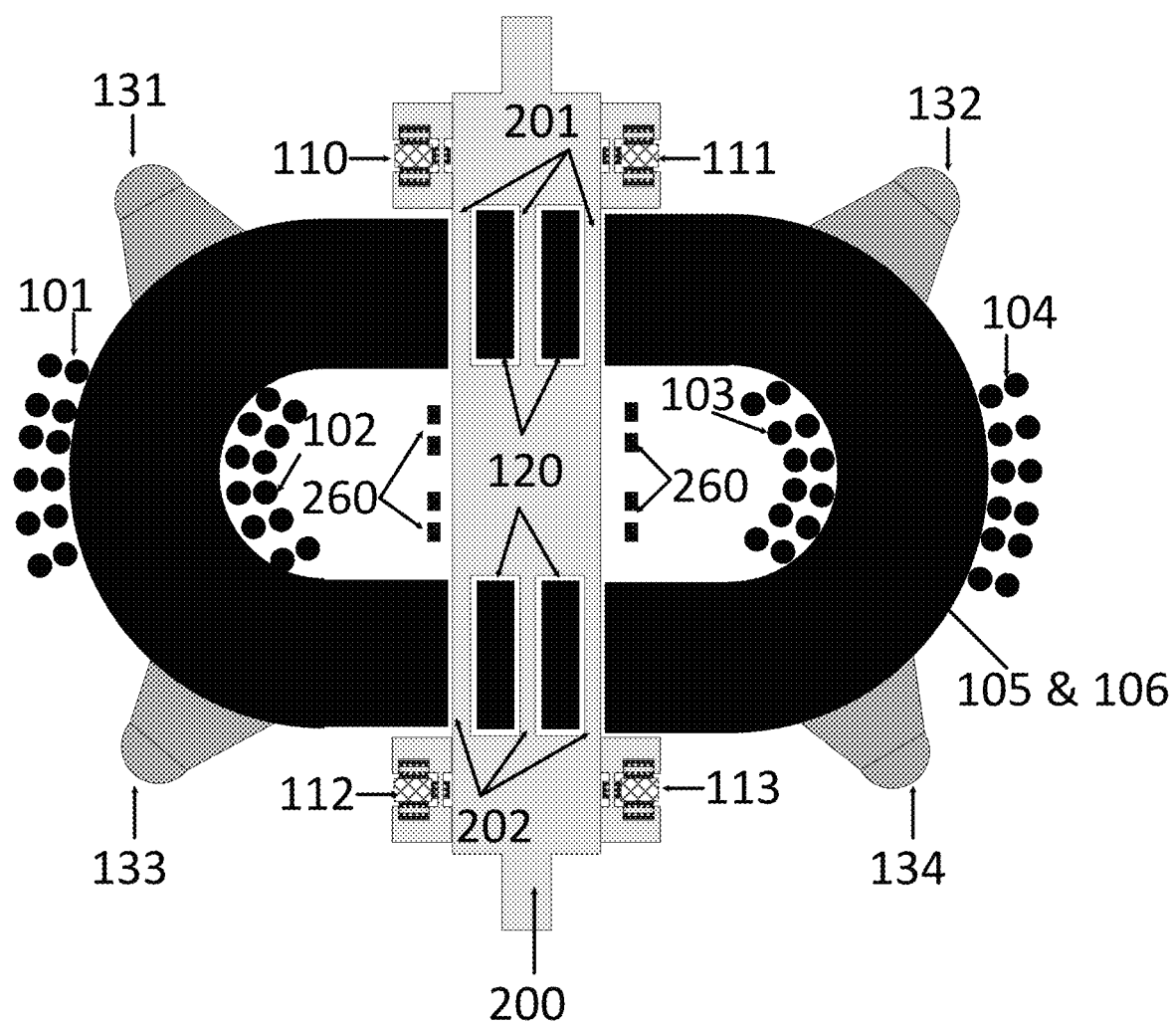
FIG. 4a shows the horizontal cut-cross sectional view of another new configuration of the machine system in which stator structures are in double-U shape with circular corners.

In FIG. 3a, rectangular corners are used for the double-U shape. One may also use circular corner for the U-shape as shown in FIG. 4a. The magnetic layers for the stator could sit on the chassis joined with two pairs of support poles 131-133, and 132-134 when the non-magnetic layers of the stator are left as air.

Figure 4B:
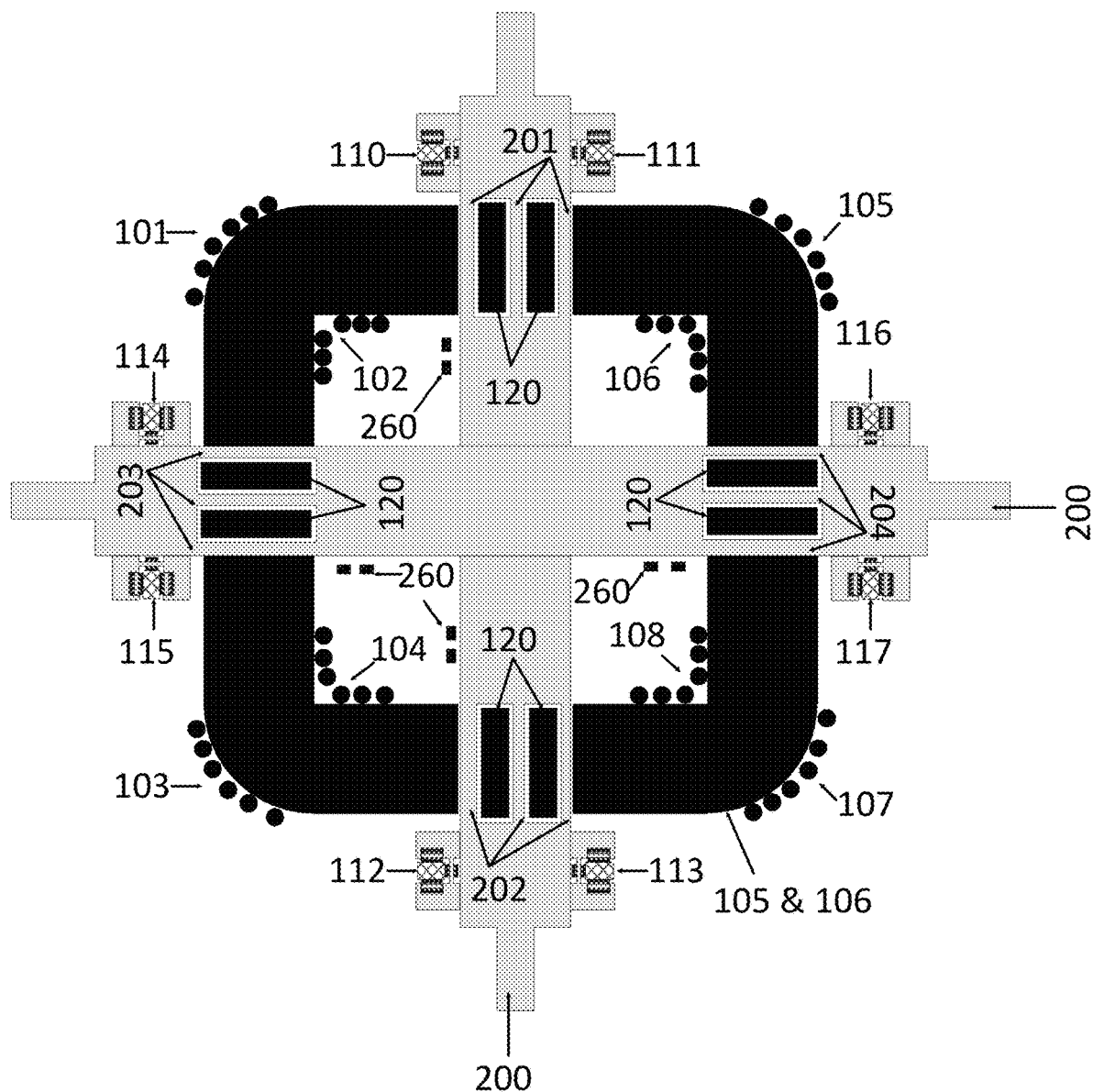
FIG. 4b shows the horizontal cut-cross sectional view of another new configuration of the machine system in which stator structures contain four rotor or mover sets.

The horizontal cut cross section view of another structure is shown in FIG. 4b, where there are four sets of rotor or movers 201, 202, 203, and 204 and symmetry is adopted for the stator structure. The flux produced by each set of the stator windings 101-102, 103-104, 105-106 and 107-108 enhances each other. The similar chassis joint with support pole pair 131-133, and 132-134 as shown in FIG. 3a and FIG. 4a for supporting the stator magnetic layers are also adopted for the structure in FIG. 4b.

In the structures shown in FIG. 3a and FIG. 4a, each has two or one pair of the rotor or mover sets. In the structure shown in FIG. 4b, there are four or two pairs of the rotor sets.

In practice, more even number of rotor sets could be adopted. Then hexagon or octagon even circle shape for the horizontal cut cross section of stator structure can be used. In fact, the structure in FIG. 4b can be modified into octagon by converting four corners into four sides where four sets of the stator windings are wound. For the hexagon arrangement, there are three sides with the rotor sets and another three sides for each of three stator windings. Nevertheless the stator windings can spread into the sides where rotor sets stand. Rotor sets and stator windings alternate each other along the circumference of the hexagon.

The structure in FIG. 1d shows that there are two nearly closed magnetic paths, each of which contains only distributed rotor or mover set. Each of the structures in FIG. 3a, FIG. 4a and FIG. 4b contains one nearly closed magnetic path. But along the path, there are multiple distributed rotor or mover sets. In each of the structures in FIG. 3a, FIG. 4a and FIG. 4b, one rotor or mover set alternates with one set of stator windings. In practice, there could be one rotor or mover set alternates with two sets of stator windings or vice versa. Or there could be one set of stator windings alternating with three or more rotor or mover sets.

In either of the structures in FIG. 1d, FIG. 3a, FIG. 4a and FIG. 4b, the currents in rotor or mover conductors of each rotor set needs be synchronized. By doing so, the force from each rotor or mover set is the same and minimized friction between bearings and support poles is achieved. Such synchronization can be achieved by proper control over the converter circuits used to drive each rotor or mover set as describe at later paragraphs.

Moreover, in either of the structures in FIG. 1d, FIG. 3a, FIG. 4a and FIG. 4b, instead of having one distributed rotor or mover set formed by multiple distributed rotor or mover units in each distributed air gap, each distributed air gap could contain multiple rotor or mover sets. For example, in FIG. 1d, instead of having one rotor or mover set in each distributed air gap, there could be two rotor or mover sets in each distributed air gap. In other words, there could be four rotor or mover sets totally. Such rotor structure is said as having two layers of rotor or mover sets. There may be more than two layers of rotor or mover sets. Such multiple layers of the rotor or mover sets could improve the effectiveness by shortening the total time for moving all the containers. This is critical as wind is highly intermittent.

Distributed stator windings or lumped stator windings could be used for the structures in FIG. 1d, FIG. 3a, FIG. 4a and FIG. 4b.

There are electromagnetic forces acting on the rotor or mover conductor vertical side as shown in FIG. 2b due to the leakage flux by the stator currents. Due to symmetrical rotor or mover pair arrangement in the structures in FIG. 1d, FIG. 3a, FIG. 4a and FIG. 4b, such electromagnetic force acting on the vertical side conductors from one pair of rotor or movers facing each other could cancel each other.

Figure 5:
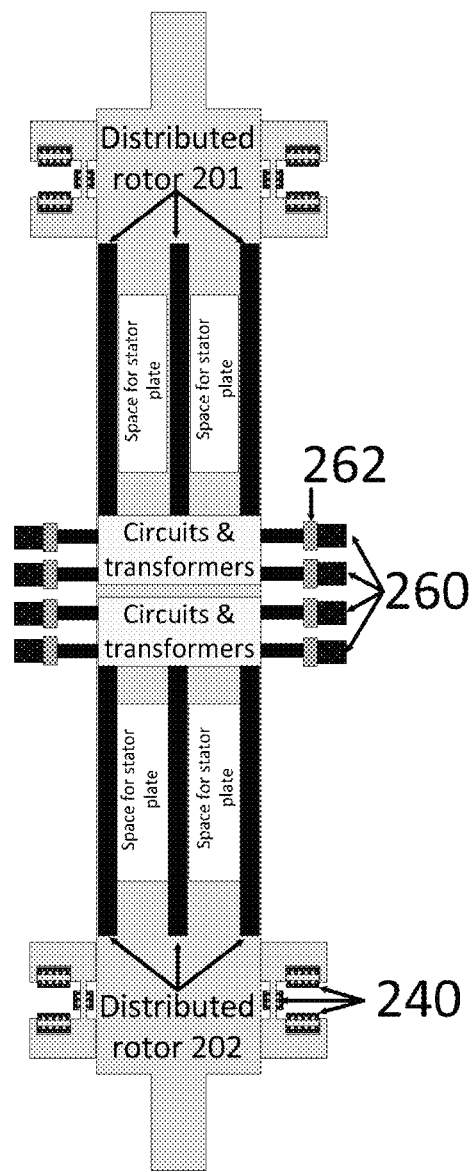

FIG. 5 shows the horizontal cut cross sectional view of the rotor or mover structure for the system in FIG. 3a and FIG. 4a, where there are circuits and transformers which will be described in later paragraphs.

Figure 6:
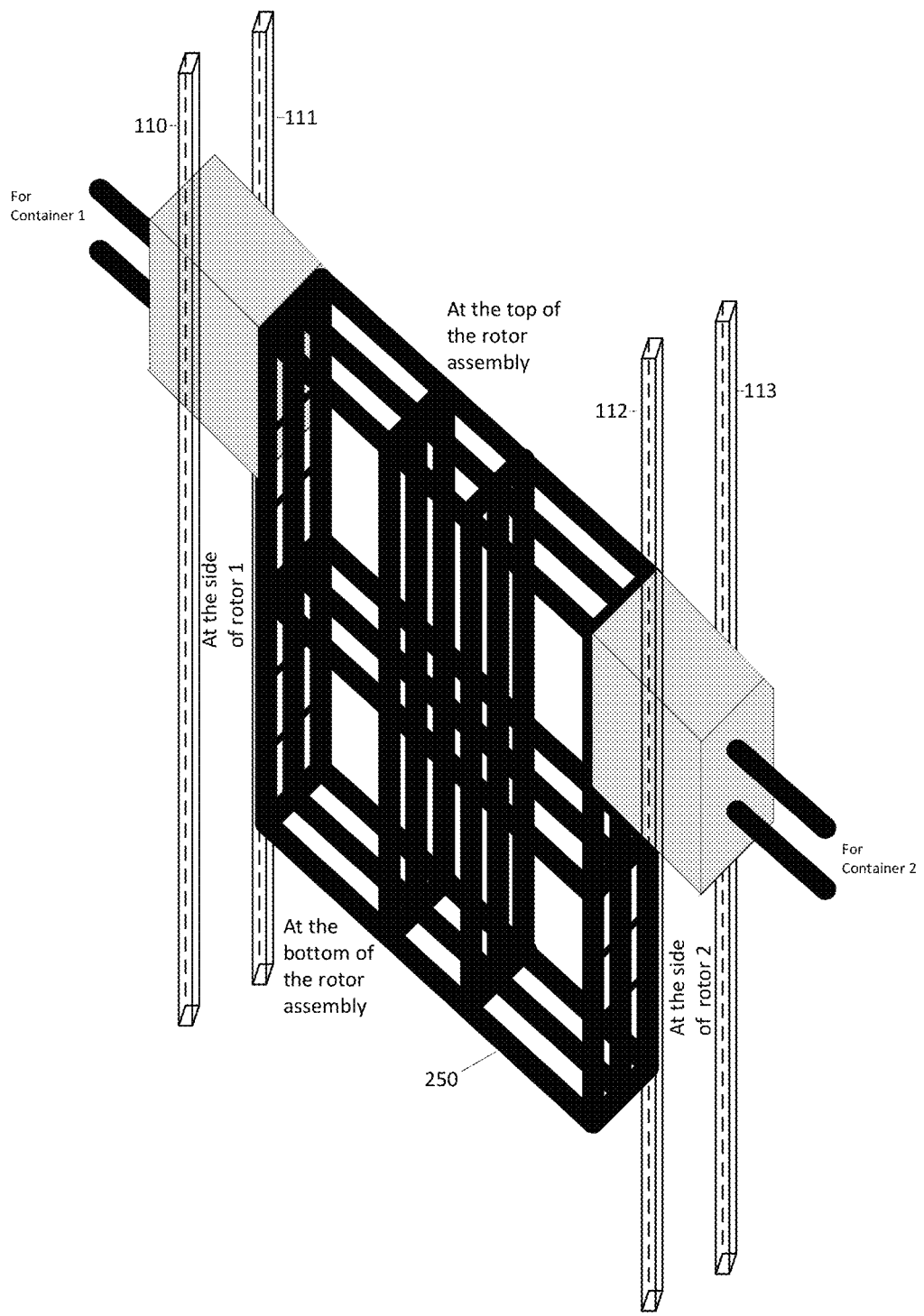

FIG. 6 shows the rotor or mover frame 250 for the rotor or mover system in FIG. 3a and FIG. 4a. The frame accommodates the multiple distributed rotor or mover units as shown in FIG. 2c.

Figure 7A:
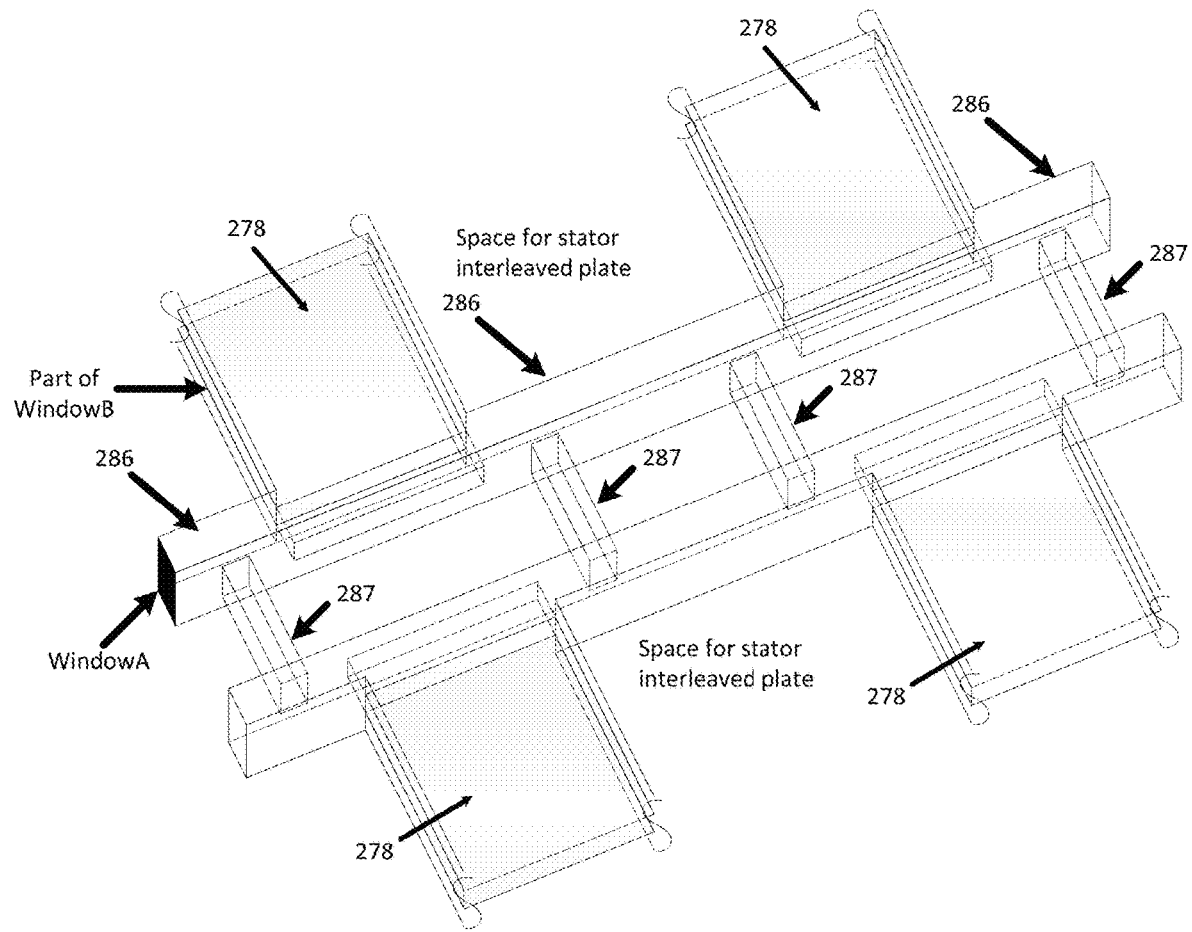
FIG. 7a shows four stainless steel casings, each of which accommodates one row of rotor or mover conductor unit.
Figure 7B:
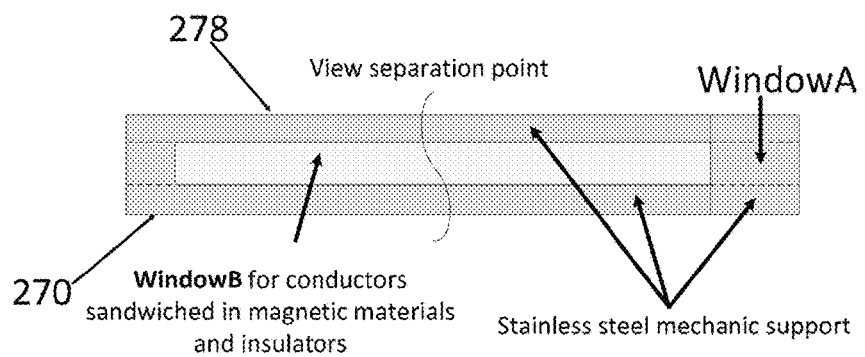
FIG. 7b shows the side view of the casing for holding the rotor or mover conductors sandwiched in magnetic materials.
Figure 7C:
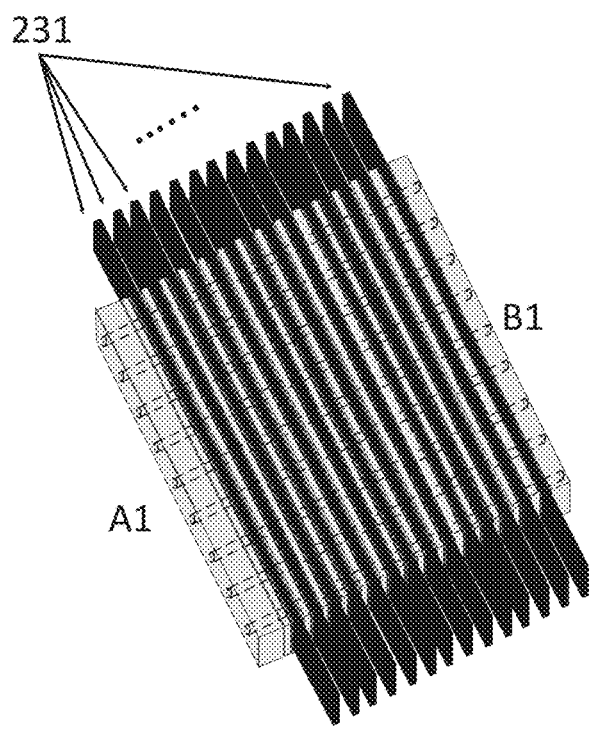
FIG. 7c shows a perspective view of the rotor or mover conductors sandwiched in magnetic materials and separated by insulators.

FIG. 7a shows stainless steel casings, each of which accommodates one row of the rotor or mover conductor unit for the basic linear machine system as shown in FIG. 1d. There are also stainless steel supports 286 and 287 for joining casings in the two rotor or mover sets; FIG. 7b shows side view of the casing for holding the rotor or mover conductors sandwiched in magnetic materials through insulators; while FIG. 7c shows one row of the rotor or mover conductors with each individual rotor conductor sandwiched in magnetic materials and separated by insulators, placed in the stainless steel casing in FIG. 7b. FIG. 7c also contains long bolt-nut made of stainless steel between side A1 and side B1. There are view separation curves in FIG. 7a, which correspond to the curves in FIG. 7b. This is for simplifying the 3-D drawing in FIG. 7a. Many parallel flat rotor or mover conductors protrude at both terminals, from which one pair of rows or two corresponding rows of the rotor or mover conductors are connected in the way shown in FIG. 2b.

Figures 7D, 7E, 7F, 7G:
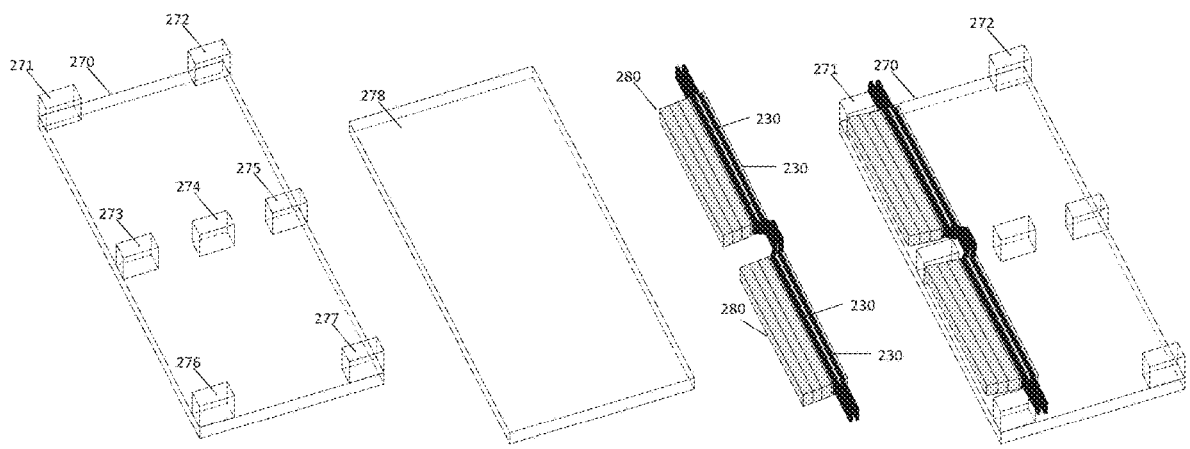
FIG. 7d shows a bottom plate of the mechanic casing in line with an embodiment including protruding parts for joining with the top plate of the casing shown in FIG. 7e.
FIG. 7e shows the top plate of the mechanic casing in line with an embodiment.
FIG. 7f shows an arrangement of rotor or mover conductors sandwiched in the magnetic materials through insulators and including a central curving.
FIG. 7g shows the arrangement of rotor or mover conductors sandwiched in the magnetic materials placed at the bottom plate of the mechanic casing.

To increase mechanic strength, another casing structure, slightly different from that in FIG. 7a and FIG. 7b by having central protrusions 273, 274 and 275 besides the protrusions 271, 272, 276 and 277 at the two ends is shown in FIG. 7d and FIG. 7e, which are bottom and top of the casing respectively. These two parts are joined by bolt-nut or other joining mechanism through seven protruding parts in FIG. 7d. An illustrative part of the rotor or mover conductors sandwiched in magnetic materials through insulators is shown in FIG. 7f, where central curving for the conductors is adopted to save space for central stainless steel protrusion 273, 274 and 275 as shown in FIG. 7d. Furthermore there are extra magnetic materials 280. In the curving part, rotor or mover conductors are only separated by insulators and with no magnetic materials. FIG. 7g shows partly assembled rotor or mover conductors and casing bottom. To save cost on the stator magnetic material, non-magnetic strips is adopted in the stator magnetic layer facing the centre curving part in FIG. 7f and FIG. 7g when the rotor or mover conductors take the approach in FIG. 7d-FIG. 7g.

Figure 8:
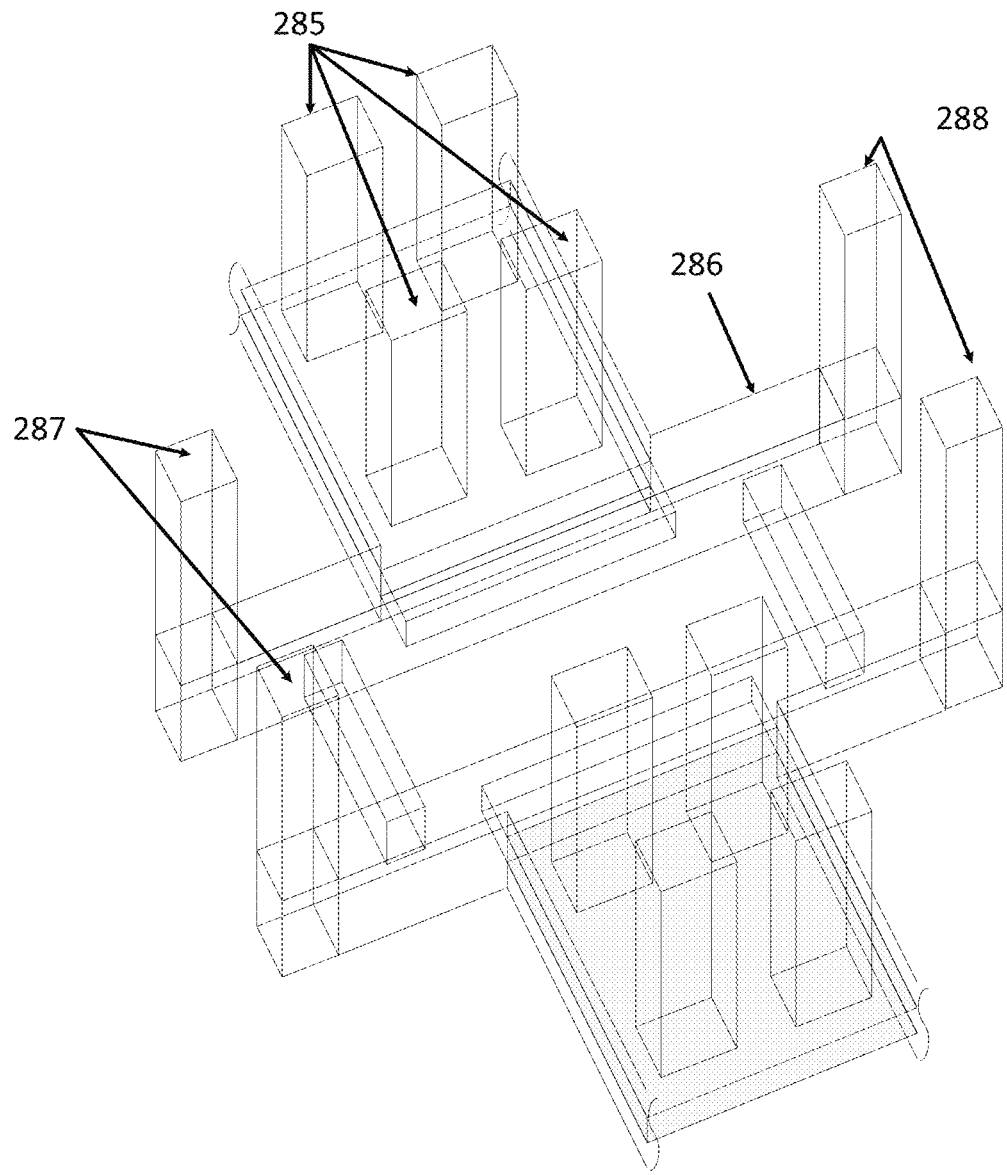

FIG. 8 shows stainless steel links 285 and supports 288 for joining two neighbouring units of the rotor or mover structure as shown in FIG. 7. These links and supports are installed on the structure as shown in FIG. 7a.

Figure 3B:
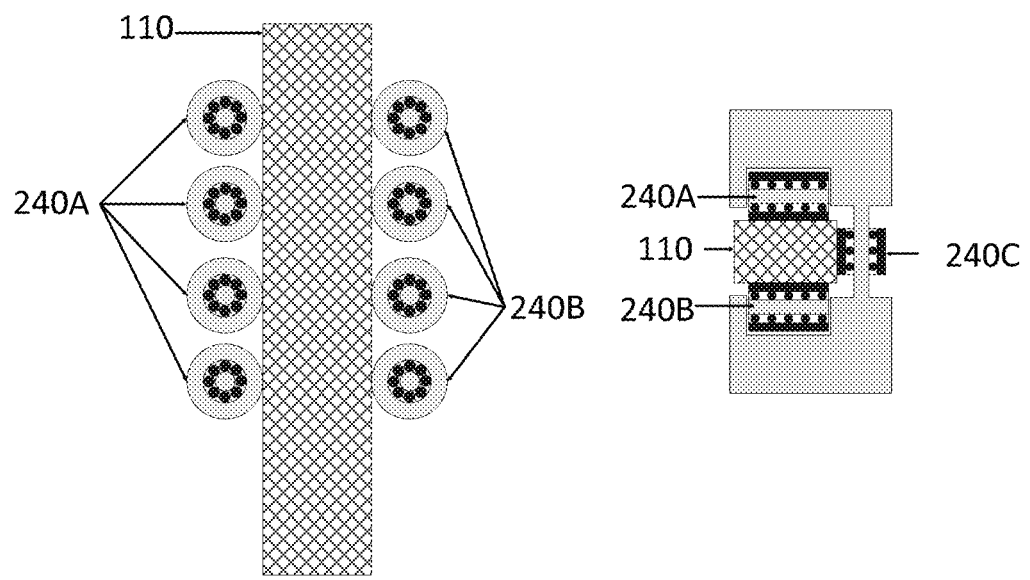
FIG. 3b shows the bearing system for the linear machine system.

Similar structures as in FIG. 7 and FIG. 8 are applied to the distributed rotor or mover structure as shown in FIG. 3a, FIG. 4a and FIG. 4b. The rotor or mover frame as shown in FIG. 6 accommodates multiple such distributed rotor or mover units. The stainless steel mechanic support of each layer as those in Fig. FIG. 7 and FIG. 8 join with the main frame as in FIG. 6. As force from each row of the rotor or mover conductors is distributed, the mechanic strength demand is less. Nevertheless the frame in FIG. 6 needs to take all the force. Hence it must be mechanically rigid enough. To have enough mechanic strength for the frame 250, each of the two rotor or movers could be divided into two sub-system and be accommodated in the two accommodating spaces as shown in FIG. 6. By doing so, there will be middle stainless steel or other reinforcement as seen in FIG. 6. When necessary, more sub-systems could be adopted in order to have more stainless steel support in the middle. FIG. 6 only shows the support poles 110, 111, 112 and 113. The bearing structures 240 as shown in FIG. 3b or in FIG. 5 are not shown.

Figure 9:
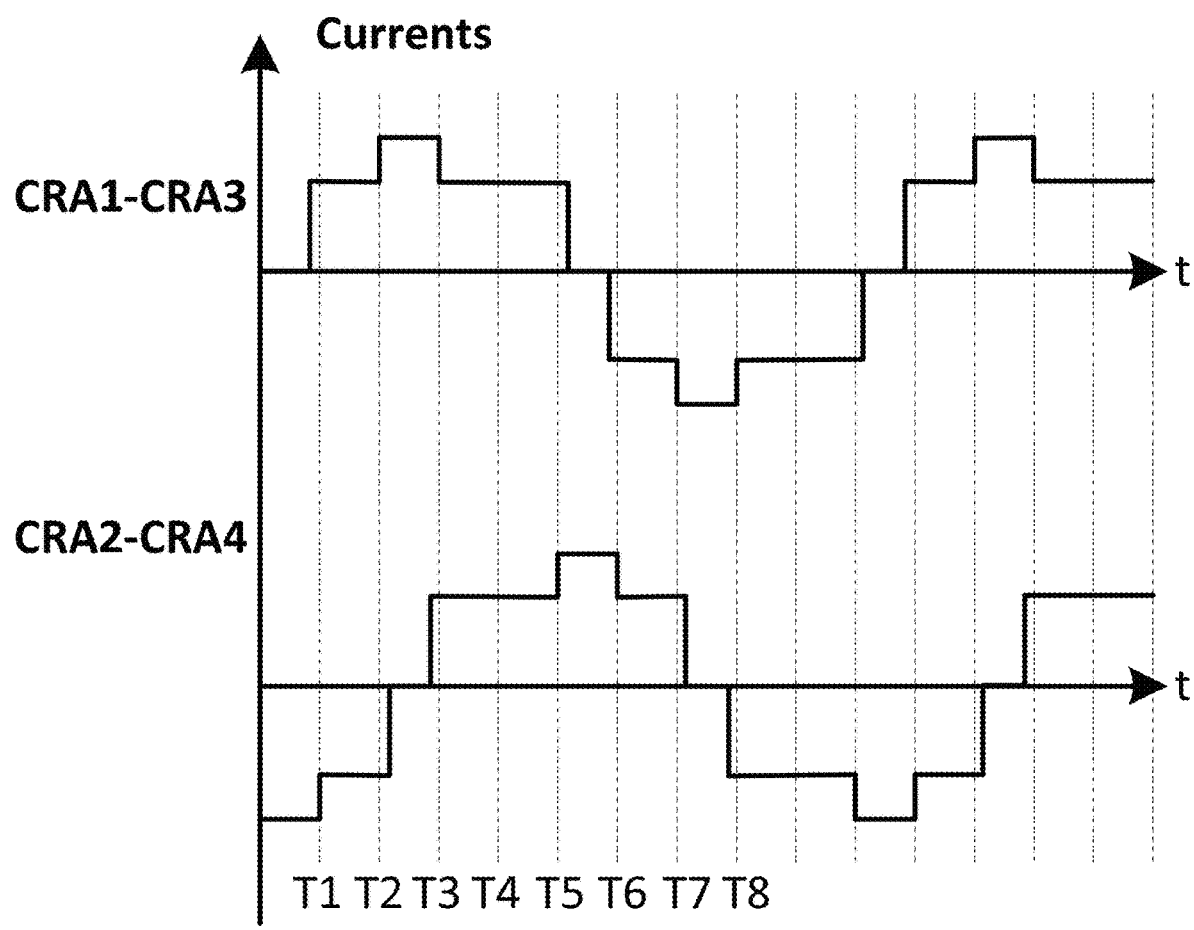
FIG. 9 shows the currents fed into the rotor or mover conductors with two rows of the rotor or mover conductors across one stator layer.

By using pulse current waveform as shown in FIG. 9 to the non-transitional rows of the rotor or mover conductors when one pair of rows or two corresponding rows of rotor or mover conductors in each basic rotor coil unit experiences transition at the boundary between stator magnetic and non-magnetic layers for the rotor or mover structure in FIG. 2c and FIG. 2d, the effective lifting force is enhanced. For example, for the duration T2-T3 as shown in FIG. 9, the coil CRA2-CRA4 experiences the transition at the boundary of the stator magnetic and nonmagnetic layers and the current flowing through it is forced to be zero before changing it to another polarity after transition. For this duration, another non-transitional coil CRA1-CRA3 conducts higher current in order to maintain the same uplifting electromagnetic force. To ensure smooth transition, the current in coil CRA1-CRA3 needs be increased first before the current in coil CRA2-CRA4 is forced to zero when the system enters transition. When the system exits transition, the pulse current in coil CRA1-CRA3 should be still there shortly after the current already starts flowing through the coil CRA2-CRA4.

Such currents as shown in FIG. 9 are applicable to all those identical coils in the multiple basic rotor or mover coil units For the rotor structure with more than two rows of the rotor or mover conductors across one stator layer, either magnetic or non-magnetic, similar driving currents as shown in FIG. 9 but with smaller phase shifts are taken.

To lift certain weight of the container with heavy mass, the number of the rotor or mover conductors can be determined. All the conductors in the rotor or mover are arranged to form a number of identical circuits, each of which consists of multiple turns of the rotor or mover conductors in series as shown in FIG. 2b. The effective inductance in each identical circuit influences the transition of transitional one pair of rows or two corresponding rows of the rotor or mover conductors between stator magnetic and non-magnetic layers as the current in each coil needs to change between 0 and ±working current. Also the currents in non-transitional rotor or mover circuits need be facilitated to change between ±working current and ±k*working current with k being around 1.5.

According to the formula $v(t)=L \cdot di/dt$, in order to complete the transition of the current in the rotor or mover conductors, the required voltage applied across the series connected rotor or mover conductors needs be high enough in order to complete transition within time limit.

Figure 10A:
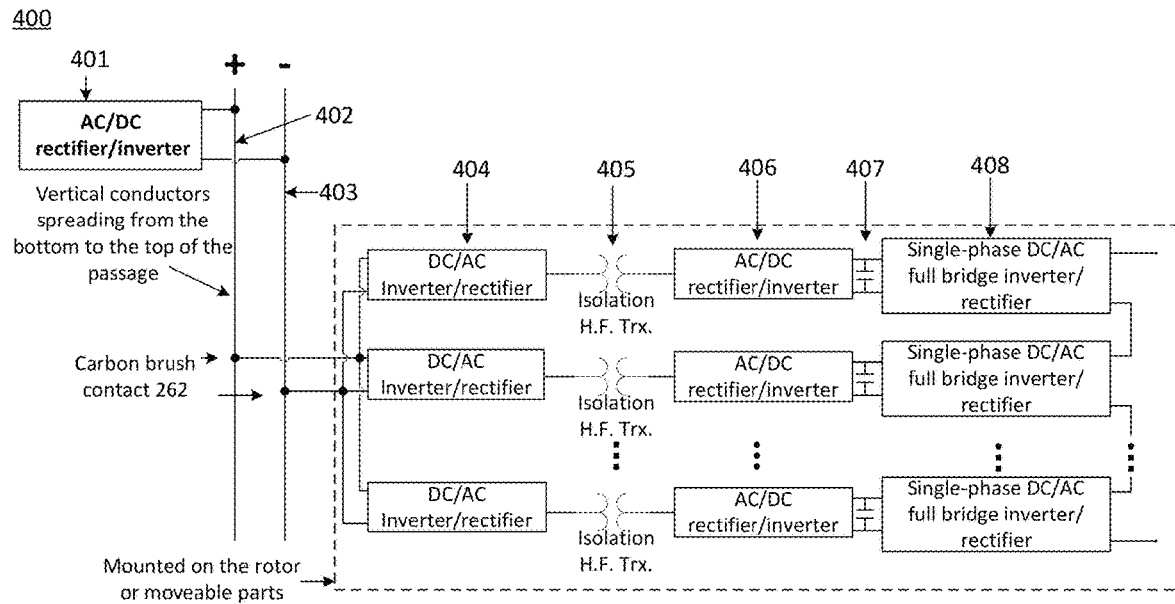
FIG. 10a shows one drive circuit for the rotor or mover in which DC transmission is adopted for the conductors from the top to the bottom of the passages.

For a practical application to achieve high pulse voltage for facilitating current change, multiple drive circuits 400 as shown in FIG. 10a can be adopted, each of which is used for one rotor or mover circuit. In such circuits, DC transmission 402 and 403 between low and high platforms is adopted. The carbon brushes 262 are installed on the rotor or mover, touching the vertical conductors 402 and 403. To reduce the weight of the converter, the isolation transformers 405 in FIG. 10a need to work at high frequency. When rotors or movers lift the containers with heavy mass from the low to high platforms, the system works in the motoring mode. For such operation, converter 401 works as a rectifier, converter 404 works as an inverter, converter 406 works as a rectifier and converter 408 works as an inverter. The DC link capacitor 407 is connected between converters 406 and 408. When the rotors or movers move from the top to the bottom platforms, the system works in the generating mode. For such operation, converter 401 works as an inverter, converter 404 works as a rectifier, converter 406 works as an inverter and converter 408 works as a rectifier.

Figure 10B:
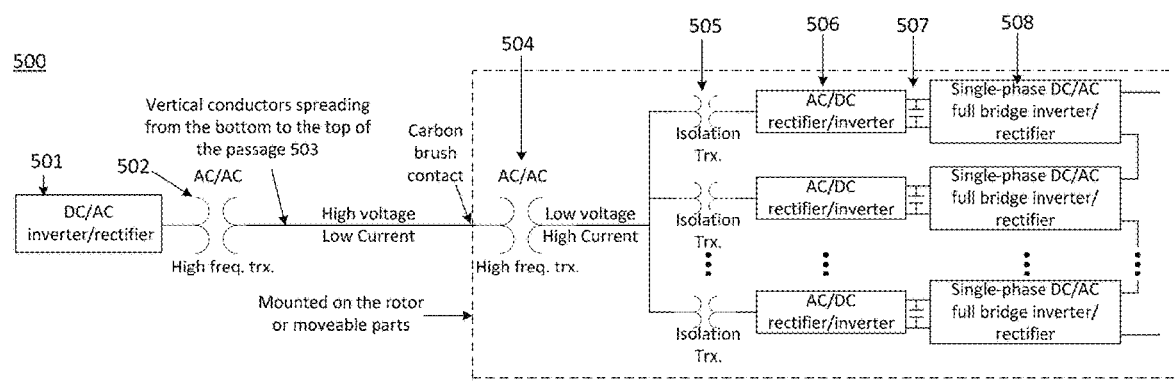
FIG. 10b shows another drive circuit for the rotor or mover in which AC transmission is adopted for the conductors from the top to the bottom of the passages.

FIG. 10b shows a drive circuit 500 with AC conductors 503 spreading from the top to the bottom of the passage. This implementation needs high-frequency transformer and high-frequency carbon brush contacts, which are more challenging compared with that in FIG. 10a.

When rotors or movers lift the containers with heavy mass from the low to high platforms, the system works in the motoring mode. For such operation, converter 501 works as an inverter, converter 506 works as a rectifier, converter 508 works as an inverter. The DC link capacitor 507 is connected between converters 506 and 508. When the rotors or movers move from the top to the bottom platforms, the system works in the generating mode. For such operation, converter 501 works as a rectifier, converter 506 works as an inverter, converter 508 works as a rectifier.

The cascade output of circuits in either FIG. 10a or FIG. 10b is to produce targeted currents in the rotor or mover circuits. Proper control can be taken to achieve such purpose.

No matter which circuit either that in FIG. 10a or in FIG. 10b is used to drive the rotor or mover circuits, its output is in cascade connection. Under normal operation without transition, one stage or several stages in cascade connection produce necessary voltage for the right currents flowing through the rotor or mover conductors while other stages are by-passed or short-circuited. During transition, more stages are cascaded to produce high voltage to facilitate the rotor or mover currents to be changed from one value to the other within a specified time limit as shown in FIG. 9.

Figure 10C:
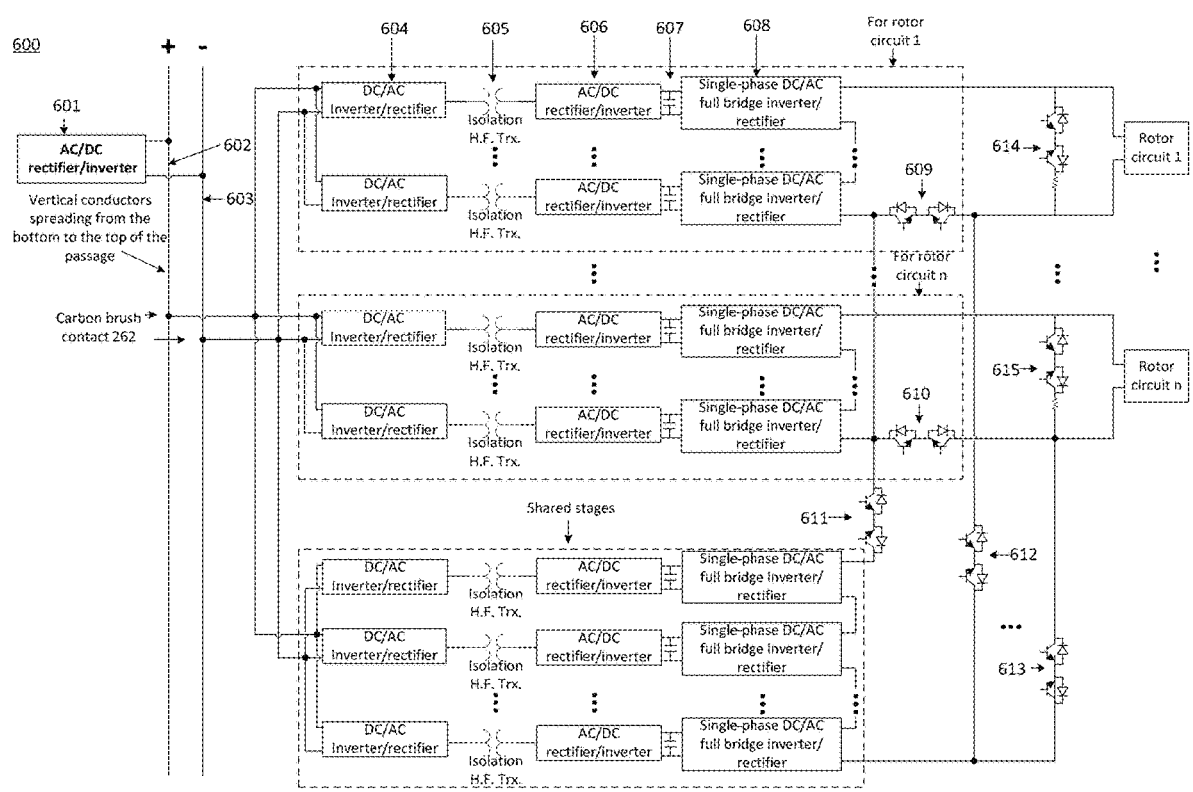
FIG. 10c shows improved drive circuits for the rotor or mover in which DC transmission is adopted for the conductors from the top to the bottom of the passages.

Each set of the rotor contains several identical coils, each of which is driven by the circuit as shown in FIG. 10a. To facilitate current transition from one value to another one, it is necessary to use pulse high voltage, which can only be achieved by having more units in cascade connection at the output as shown in FIG. 10a. If each rotor coil has the circuit as shown in FIG. 10a which sit the rotor, there would be many such units and total weight of the rotor is pronouncedly increased. To solve this problem, one way is to share units which are only used for the coil in transition. Such approach is shown in FIG. 10c, which still adopts DC transmission for the conductors from the top to the bottom of the passages. For those circuits driving non-transitional rotor coils, bi-directional switches 609 and 610 etc for each oil are in the closed position and shunt switches 614 and 615 etc are in open position. Now assume that the rotor circuit 1 or coil 1 runs into transition or the boundary between magnetic and non-magnetic stator layers, switch 614 is turned on first; then switch 609 is turned off; then switches 611 and 612 are turned on and then switch 614 is turned off. By doing so, the high voltage is applied across rotor coil 1 to facilitate its current change. Series resistance is connected with switch 614 to avoid unsmooth transition. Since antiparallel diodes could be used in the converter 608, bi-directional switches 614 and 615 could be omitted. Before the rotor circuit 1 or coil 1 runs into transition, it is necessary to facilitate other coils to increase currents to the level as shown in FIG. 9. Such change could also be facilitated by the shared stages as well. By having the shared stages, overall rotor weight is reduced. There could be multiple such shared stages since there are quite some of the rotor circuits.

Figure 10D:
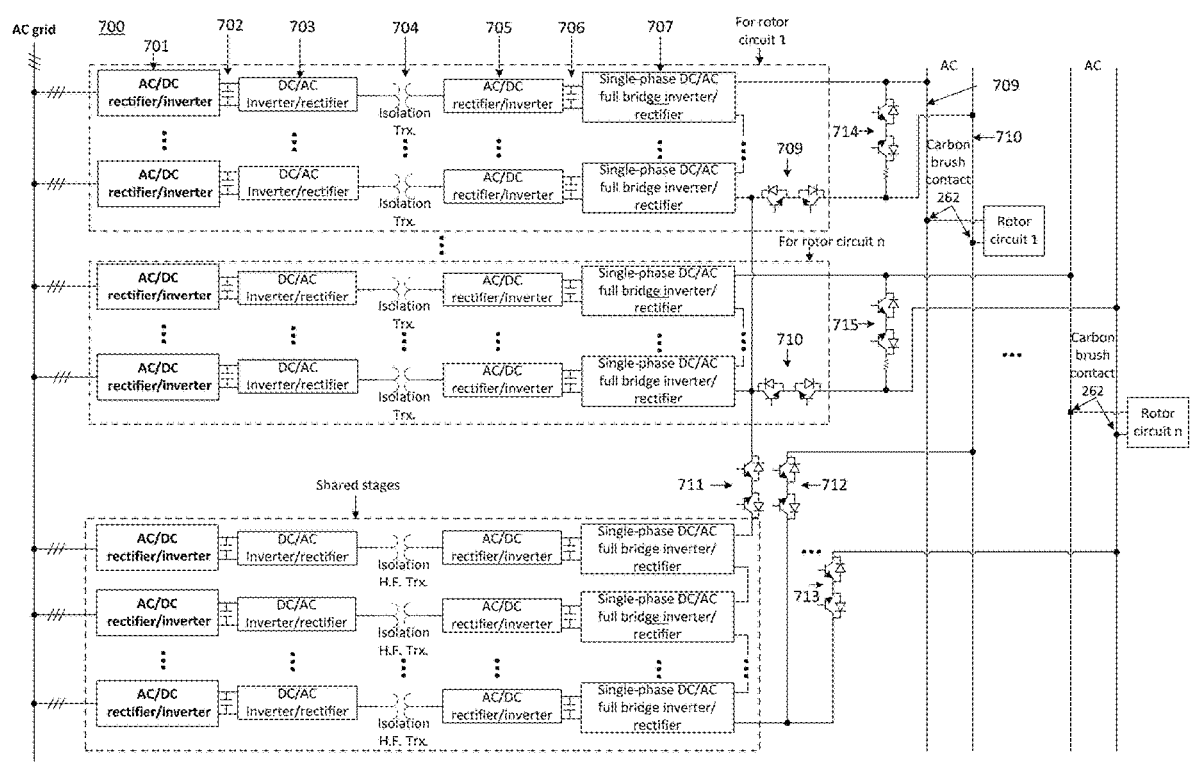
FIG. 10d shows a drive circuit for the rotor or mover in which AC transmission is adopted for the conductors from the top to the bottom of the passages and converter circuits sit either at high or low platform.
Figure 10E:
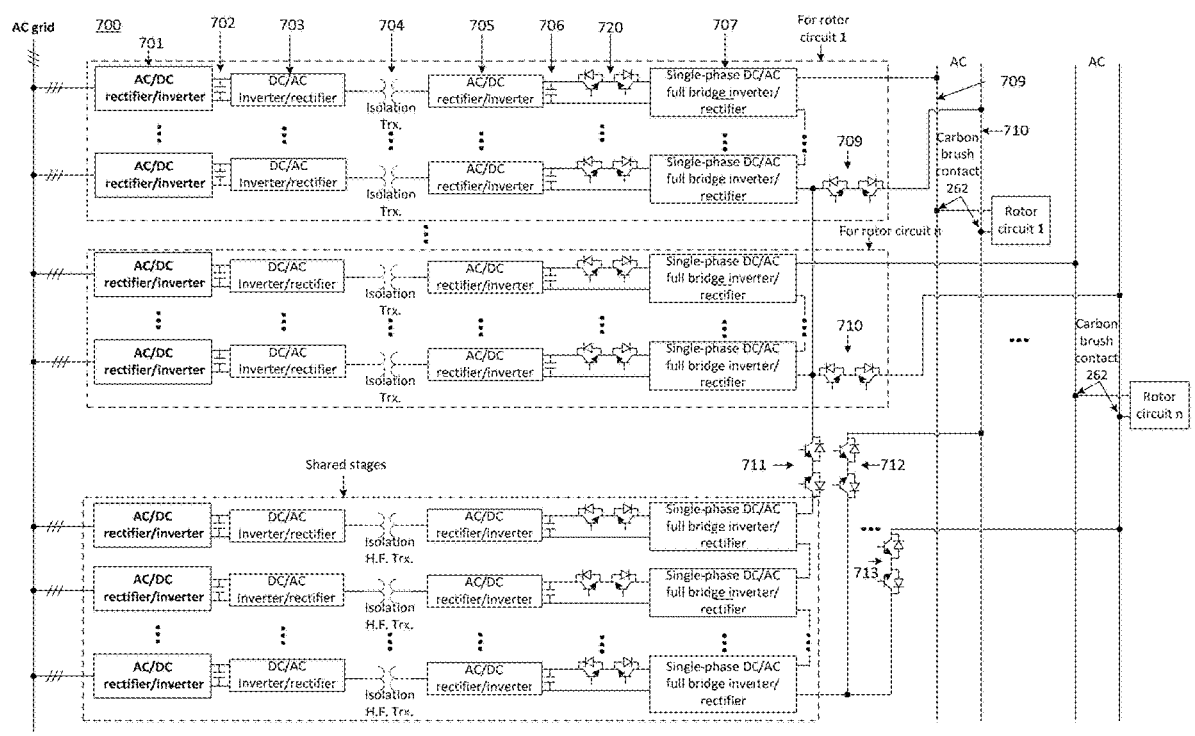
FIG. 10e shows a drive circuit modified from that in FIG. 10d.

To further reduce the rotor weight, it is possible to place the converters and isolation transformer on the high or low platform as shown in FIG. 10d, where AC transmission for conductors spreading from low to high platforms is used. In such a system 700, there is AC grid, AC/DC converter 701, DC-link capacitor 702, DC/AC converter 703, isolation transformer 704, AC/DC converter 705, DC-link capacitor 706, DC/AC converter 707. As the system sits on either high or low platform, weight is not the main concern any more. Hence the isolation transformers 704 can work at relatively low frequency, such as several kilohertz. The working mechanism for the circuit in FIG. 10d is nearly the same as that in FIG. 10c. Under non-transitional movement, the switches 709 and 710 etc are in the closed position. Switches 711, 712, 713, 714, and 715 are off. When it is time to increase non-transitional coils' currents into higher ones such as in n-stage for the rotor circuit n or coil n, then switch 715 is turned on first and switches 711 and 713 are turned on, followed by 710 being turned off. Then switch 715 is turned off. After that the high voltage is produced by the circuit with more cascade output. After the current in rotor circuit n or coil n is changed to the targeted value, switch 715 is turned on; then switches 711, 713 are turned off; then switch 710 is turned on; finally switch 715 is turned off. After transitional coil completes transition. Then similar steps as described above can be taken to reduce the high current in the non-transitional coils back to normal. Again switches 714 and 715 with series resistor can cause extra copper losses reducing efficiency. For a practical application, it is good to use antiparallel diodes in converters 707 complete commutation. If doing so, there is no existence of switches 714 and 715 etc. Such drive circuits are shown in FIG. 10e, where switches 720 are used to facilitate free-wheeling commutation during transition. That is to say, each time when combination of or disconnection from the shared stages for facilitating transition occurs, switches 720 are turned off. After the circuit is re-formed, switches 720 are turned on. For example, when it is time to connect all the stages in the circuit for rotor circle 1 with the shared stage for changing current in the rotor circuit 1, switch 720 is turned off first. Then switches 711 and 713 are turned on, followed by switch 709 being turned off. Next switch 720 is turned on. Then high voltage is applied across the rotor circuit 1 to facilitate its current change. After the current is changed to the targeted value, switch 720 is turned off, followed by 709 being turned on. Then switches 711 and 713 are turned off. Next switch 720 is turned on.

Since the rotors move at a speed of several meters per second and the vertical distance of one stator layer is in the scale of around one meter, the AC currents flowing through the vertical conductors 709 and 710 etc spreading from the bottom to the top of the platform in FIG. 10d or FIG. 10e varies in several to tens of hertz. Therefore there is no pronounced issue of ac losses along the conductors. There will be no obstacle for using carbon brush to conduct currents to/from the rotor circuits.

When the space and weight are not issues, then converter 701, DC-link capacitor 702, converter 703 and transformer 704 in FIG. 10d or FIG. 10e can be replaced by 50 Hz transformers.

Figure 11:
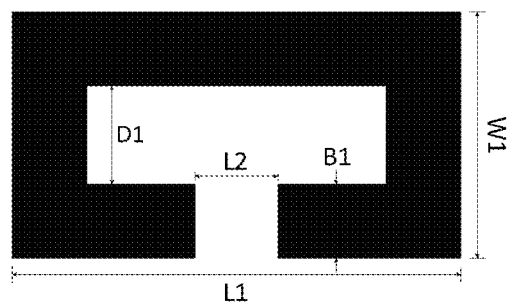
FIG. 11 shows the horizontal cross section of one side of the stator structure same as that in FIG. 1d but with lumped air gap.

FIG. 11 shows the horizontal cut cross section of one side of the stator structure as that in FIG. 1d but with lumped air gap. This is for easiness of determining the total air gap. After the total air gap is worked out, it is divided into several identical gaps, each of which is filled with one distributed rotor or mover unit, sandwiched by the interleaved stator plates.

The lifting force required during start/stop can be calculated by the formula below $$F - mg = ma = m\frac{dv}{dt}$$

Under normal travel, the total lifting force produced by the rotor or mover just needs be slightly higher than the total weight, an addition of the rotor or mover weight and the weight of the containers with heavy mass. At the start-up for the bottom-to-top movement, the required force is greater in order to accelerate the rotor or mover from the stationary to full speed. From equation above, one can see that the required lifting force is equal to the total rotor or mover weight plus the term due to acceleration. Assume that the rotor or mover is accelerated from zero to 6 m/s using 1 s. Then the required start-up force is $$F=m(g+a)=m[9.81+(6-0)/1.0]=15.81 \text{ m or } 15.81$$
$$m/(9.81 \text{ m})=1.612 \text{ or times total weight.}$$

If one adopts two rows of rotor or mover conductors across one stator layer and each row of rotor or mover conductors carries 80% of the rated current for non-transitional movement, then under normal operation, when the transition between magnetic and non-magnetic layers occurs for one pair of rows or two corresponding rows of the rotor or mover conductors, another non-transitional pair of rows or two corresponding rows of the rotor or mover conductors needs to take at least 160% of its rated current. In contrast, if one adopts three rows of rotor or mover conductors across one stator layer and each conductor carries 80% of the rated current, then under normal operation, when the transition between magnetic and non-magnetic layers occurs for one pair of rows or two corresponding rows of the rotor or mover conductors, another two pairs of rows of the rotor or mover conductors only needs to take at least 120% of its rated current. Therefore in terms of reducing the burden of the current carried by each conductor, it is better to place more rows of the rotor or mover conductors across one stator layer. But such arrangement leads to higher inductance in each rotor or mover coil which demands higher voltage to facilitate the current change from one value to the other within short time during transition. Nevertheless more rows of the rotor or mover conductors can effectively relieve the start-up current demand as described below.

If one adopts three rows of the rotor or mover conductor across one stator layer, then during start-up at the bottom of the passage, each rotor or mover conductor needs to take 80%×3×1.612/3=80%×1.612=128.96% of rated current during the non-transition movement. During transition, to keep the same lifting force, each of the non-transitional rotor conductors needs to take 128.96%×3/2=193.44% of rated current. Such high current during transition can cause overheat problem. To alleviate such problem, a reduced current such as 150% of the rated current can be conducted by the non-zero rotor or mover conductors. Then the total acceleration takes slightly longer than the targeted one second. During the start-up, forced cool-air can be blown towards the rotor or mover conductors to ventilate. By doing so, the rotor or mover temperature can be kept within limit.

When the rotor or mover reaches the bottom during downward movement and is ready to stop, the same high up-lifting force needs be produced in order to reduce the rotor or mover full speed to zero within a specified time.

When the containers are lifted upward and reach the top of the passage, the stoppage can be achieved by reducing rotor or mover currents.

When the rotor or mover starts being lowered from the top of the passage, uplifting electromagnetic force needs be controlled to ensure the rotor or mover starting from zero speed to accelerate to full speed, not to over-speed.

Precision sensors such as laser beam based ones etc are adopted to sense exact location of the rotors or movers. Such information is fed into the controllers for the converters as shown in FIG. 10. By doing so, proper switching in the converters can be achieved to ensure that nearly constant electromagnetic forces are produced during the movement, no matter during transition or non-transitional movement. Precise rotors' or movers' positions are also used to control the converters during the start-up/stop.

Example Design

Tables 1 through 7 below show one example design using the basic structure in FIG. 1d with air as alternating layer in the stator structure. Table 1 includes dimensions of the stator core. Totally the height of the passage is 200 m with 200 alternating layers, either stator magnetic layer or non-magnetic layer being counted as one separate layer. Hence vertical height of each layer is 1 m. Table 2 includes the basic information such as air permeability, saturation flux density, steel density etc. It also includes rated currents for the rotor or mover and stator used in this example design. The stator conductor increment factor is given as well in Table 2, which is 16. This is to reduce the copper losses in the stator windings. The material costs are shown in Table 3. The electricity tariff per kWh is also shown there. Table 4 shows the rotor or mover information, from which one can see that the air gap of the rotor or mover is 0.32 m and the total grouped air gap of the rotor or mover L2 in FIG. 11 is around 0.64 m. Such total air gap of 0.64 m are divided into multiple identical distributed air gaps. Each of them is filled with one distributed rotor or mover unit which is sandwiched by the interleaved stator plates in the way as shown in FIG. 1d. By doing so, the fringing effect produced by the stator currents on the effective electromagnetic lifting force on the rotor is mitigated. Table 5 shows extra information such as loss factor and cost factor etc. The loss factor is adopted in order to take into account other losses which cannot be calculated in the current approach. The breakdown construction cost is shown in Table 6. Table 7 includes efficiency and electric loss components.

The basic structure in FIG. 1d contains two symmetrical stator parts, mirroring to each other. Each part contains two layers of rotor or mover sets or totally four rotor or mover sets in this example design. By doing so, moving containers is more effective.

Losses like friction losses, converter losses and also losses due to movement of the containers along the top or bottom platforms or parking lots are hard to quantify. Instead multiplying the electric losses, both stator copper losses and rotor or mover copper losses by a factor is adopted. In this case, the factor is set to 3.0. Such approach could be optimistic. Hence in a real system, the efficiency could be less than 84.3% as shown in Table 7. Nevertheless a proper design could lead to higher efficiency. Conservatively an efficiency being above 80% could be reached for a practical system.

TABLE 1

Dimensions of the stator structure

| Dimensions | m |
|---|---|
| Core width B1 | 0.8 m |
| Core length L1 | 2.95 m |
| Core inner space distance D1 | 3.89 m |
| Height of the passage | 200 m |
| Alternate layers | 200 |

TABLE 2

Parameters

| Air permeability | $4\pi \times 10^{-7}$ H/m |
|---|---|
| Saturation flux density | 1.25 T |
| Steel density | $8 \times 10^3$ kg/m$^3$ |
| Copper mass density | $8.96 \times 10^3$ kg/m$^3$ |
| Copper conductivity | $5.96 \times 10^7$ S/m |

TABLE 2-continued

Parameters

| | |
|---|---|
| Aluminum conductivity | $3.5 \times 10^7$ S/m |
| Stator current | 500A |
| Rotor or mover current | 500A |
| Cross sectional area of individual stator conductor | $3.5 \times 10^{-4}$ m$^2$ |
| Stator conductor increment factor | 16 |
| Total each stator conductor's area | $16 \times 3.5 \times 10^{-4}$ m$^2$ |
| Cross sectional area of individual rotor or mover conductor | $3.5 \times 10^{-4}$ m$^2$ |

TABLE 3

Material cost

| Dimensions | m |
|---|---|
| Copper | 0.65US$/kg |
| Aluminium | 2000US$/m$^3$ |
| Steel | $600 \times 8$ US$/m$^3$ |
| Concrete or cement | 30US$/ton |
| Electricity tariff per kWh | 0.20US$ |

TABLE 4

Rotor or mover information

| | |
|---|---|
| Rotor or mover conductor pair per layer | 4 |
| Rotor or mover conductor number per section | 20 |
| Total number of conductors per layer | $4*2*20 = 160$ |
| Number of rows of rotor or mover conductors per stator alternate layer | 2 |
| Rotor or mover conductor coil number (formed by two rows of the conductors) | 10 |
| Conductor | Copper |
| Thickness of rotor or mover conductor | 2 mm |
| Air gap in rotor or mover | 0.32 m = 2 mm*160 |
| Width of the rotor or mover (L2 in FIG. 11) | 0.64 m |
| Travel speed of the rotor or mover | 6.0 m/s |
| Number of rotor or movers per part | 2 |
| Height of each rotor or mover set | $2*10 = 20$ m |

TABLE 5

More information

| | |
|---|---|
| Number of containers | 2000 |
| Loss factor | 3.0 |
| Cost factor | 2.0 |
| Mass per container | 114.10/2 = 57.5 ton |
| Yearly usage rate | 80% |
| Total energy stored | 175.33 MWh |

TABLE 6

Breakdown construction cost

| Parts | Million dollars |
|---|---|
| Steel | 5.4044 |
| Heavy mass | 5.448 |
| Copper for the rotor or mover | 0.1044 |
| Aluminium for the stator | 1.5680 |
| Total Cost | 2*25.05 = 50.10 |

TABLE 7

Losses and efficiency

| | kW |
|---|---|
| Power losses in the rotor or mover | 86.29 |
| Power losses in the stator | 714.29 |
| Power at 6 m/s | 13440 |
| One-way efficiency | 91.8% |
| Round-way efficiency | 84.3% |

Since the stator magnetic cores work in a minor loop of magnetization, demagnetization is needed for an efficient operation. Furthermore the minor problem of armature reaction due to the currents in the rotor or mover conductors needs be considered for a detailed design.

With the above design, the number of profit return year could be less than nine.

Interpretation

In Accordance with:

As described herein, 'in accordance with' may also mean 'as a function of' and is not necessarily limited to the integers specified in relation thereto.

EMBODIMENTS

Reference throughout this specification to "one embodiment", "an embodiment", "one arrangement" or "an arrangement" means that a particular feature, structure or characteristic described in connection with the embodiment/arrangement is included in at least one embodiment/arrangement of the present invention. Thus, appearances of the phrases "in one embodiment/arrangement" or "in an embodiment/arrangement" in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more embodiments/arrangements.

Similarly it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including:

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to grid-scale massive energy storage. The heavy mass energy storage system disclosed in this invention is the most useful for very large-scale energy storage, where an efficient linear machine is adopted which contains interleaved stator structures, distributed or lumped stator windings, distributed rotor or mover structures, each of which is sandwiched in the interleaved stator plates, and also contains multiple sets of the rotor or mover circuit each set being with multiple conductors in series.

NOTES FOR USING THIS TECHNOLOGY

If this invention can be converted into commercial product, then the inventor hopes reasonable invention fee or patent fee will be collected from users without putting heavy levy on them. Part of the income will be donated to United Nations, European Union, Red Cross and other charity organizations etc for advocating sustainable evolvement of our earth and better reconciliation among nations and different interest groups.

The claims defining the invention are as follows:

1. A heavy mass energy storage system, comprising
a linear machine system, consisting of
A rotor or mover structure which contains one or multiple pairs of rotor or mover set or odd number of rotor or mover set;
interleaved stator structure with alternating magnetic and non-magnetic layers;
interleaved stator plates;
lumped or distributed stator windings;
distributed rotor or mover units, each of which is sandwiched by interleaved stator plates;
multiple rows of the rotor or mover conductors across one stator layer;
high platform and low platform where containers with heavy mass sit;
vertical supporting poles along which the rotor or mover moves vertically through bearings installed on the rotor or mover;
vertical conductors spreading from the passage linking the low-platform to the high-platform along which the currents flow to and from the rotor or mover circuits through carbon brushes;
converter circuits being connected between carbon brushes and rotor or mover circuits when they sit on the rotor or mover; or
converter circuits being connected to vertical conductors for conducting rotor or mover currents when the converter circuits sit on either low or high platform.

2. A method for the system as claimed in claim 1, wherein
A high voltage is produced to facilitate change of the rotor or mover current from one value to the other in the non-transitional rotor or mover coils
when two sides of each of multiple rotor coils in transition cross the boundary between stator magnetic and non-magnetic layers or
when multiple sides of rotor coils for vertical coil arrangement in transition cross the boundary between stator magnetic and non-magnetic layers.

3. A method for operating the energy storage system as claimed in claim 1, wherein
pulse currents are applied to the non-transitional rotor or mover conductors when other transitional rotor or mover coils cross the boundary between stator magnetic and non-magnetic layers during start/stop of the rotors or movers; and
forced cool air is blown towards the rotor or movers at the start/stop or under emergency operation.

4. A method for operating the energy storage system as claimed in claim 1, wherein
when the rotors or movers move down after lifting heavy mass from low-platform to high-platform for converting electricity into potential energy, re-generation is adopted to convert the potential energy of the rotors or movers back to electricity.

\* \* \* \* \*